(12) United States Patent
Iki et al.

(10) Patent No.: US 8,094,914 B2
(45) Date of Patent: Jan. 10, 2012

(54) MICROSCOPE SYSTEM AND IMAGE PROCESSING METHOD USED FOR OBSERVATION OF A SPECIMEN

(75) Inventors: Yoichi Iki, Tokyo (JP); Yutaka Sasaki, Yokohama (JP); Mikes Josef, Prague (CZ); Svoboda Miroslav, Psary (CZ); Sedlak Roman, Prague (CZ)

(73) Assignee: Nikon Corporation, Tokyo (JP)

( * ) Notice: Subject to any disclaimer, the term of this patent is extended or adjusted under 35 U.S.C. 154(b) by 1221 days.

(21) Appl. No.: 11/661,235

(22) PCT Filed: Sep. 15, 2005

(86) PCT No.: PCT/JP2005/017023
§ 371 (c)(1),
(2), (4) Date: May 17, 2007

(87) PCT Pub. No.: WO2006/033273
PCT Pub. Date: Mar. 30, 2006

(65) Prior Publication Data
US 2008/0095424 A1   Apr. 24, 2008

(30) Foreign Application Priority Data

Sep. 22, 2004   (JP) ................. 2004-276095

(51) Int. Cl.
*G06K 9/00* (2006.01)
*G06K 9/32* (2006.01)
(52) U.S. Cl. ..................... 382/133; 382/294
(58) Field of Classification Search .............. 382/133
See application file for complete search history.

(56) References Cited

U.S. PATENT DOCUMENTS 5,793,969 A * 8/1998 Kamentsky et al. .......... 709/213
(Continued)

FOREIGN PATENT DOCUMENTS

JP   A-5-215969   8/1993
(Continued)

OTHER PUBLICATIONS

Dec. 29, 2010 Supplementary European Search Report for European Patent Application No. 05783260.2.

*Primary Examiner* — David Zarka
(74) *Attorney, Agent, or Firm* — Oliff & Berridge, PLC

(57) ABSTRACT

An object of the present invention is to provide a microscope system and an image processing method which are practical and capable of imaging a specimen efficiently in a short period of time and also ensuring reduction of the data amount of a generated image. Accordingly, the microscope system includes a storage section 24, 27 which stores identification information of a specimen 10A, a macro image and a micro image in a correlated manner, a stage member 11 on which the specimen as an observation target is mounted, an acquiring section 39B, 40 which acquires identification information of the specimen, a first display section 16, 22, 40, 47, 24 which displays a macro image of the specimen by reading a macro image correlated with the identification information from the storage section (or by imaging the specimen), a second display section 12 to 22, 47, 40, 24 which displays a micro image of the specimen by imaging the specimen, and an additional storing section 40 which additionally stores in the storage section in accordance with instruction from outside a micro image displayed on the second display section in a correlated manner with the macro image displayed on the first display section and the identification information acquired by the acquiring section.

10 Claims, 16 Drawing Sheets

U.S. PATENT DOCUMENTS

| | | | |
|---|---|---|---|
| 6,031,930 A * | 2/2000 | Bacus et al. | 382/133 |
| 6,101,265 A * | 8/2000 | Bacus et al. | 382/133 |
| 6,137,897 A * | 10/2000 | Emi et al. | 382/128 |
| 6,404,906 B2 * | 6/2002 | Bacus et al. | 382/128 |
| 6,466,690 B2 * | 10/2002 | Bacus et al. | 382/133 |
| 6,522,774 B1 * | 2/2003 | Bacus et al. | 382/133 |
| 6,606,413 B1 * | 8/2003 | Zeineh | 382/232 |
| 6,674,881 B2 * | 1/2004 | Bacus et al. | 382/128 |
| 6,711,283 B1 * | 3/2004 | Soenksen | 382/133 |
| 2003/0112330 A1 * | 6/2003 | Yuri et al. | 348/80 |
| 2003/0208755 A1 * | 11/2003 | Zimmerman | 725/34 |
| 2003/0210262 A1 | 11/2003 | Gahm et al. | |

FOREIGN PATENT DOCUMENTS

| | | |
|---|---|---|
| JP | A-11-275572 | 10/1999 |
| JP | A-2000-055635 | 2/2000 |
| JP | A-2000-276545 | 10/2000 |
| JP | A-2002-514319 | 5/2002 |
| JP | A-2003-248176 | 9/2003 |
| WO | WO 98/39728 A1 | 9/1998 |

* cited by examiner

FIG. 2
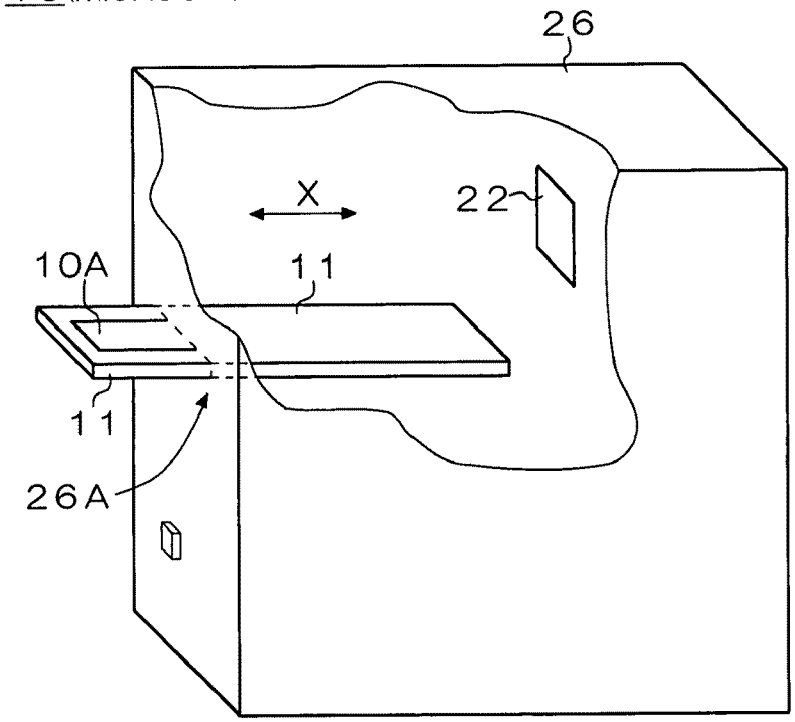
(A) 10 (MICROSCOPE SYSTEM)
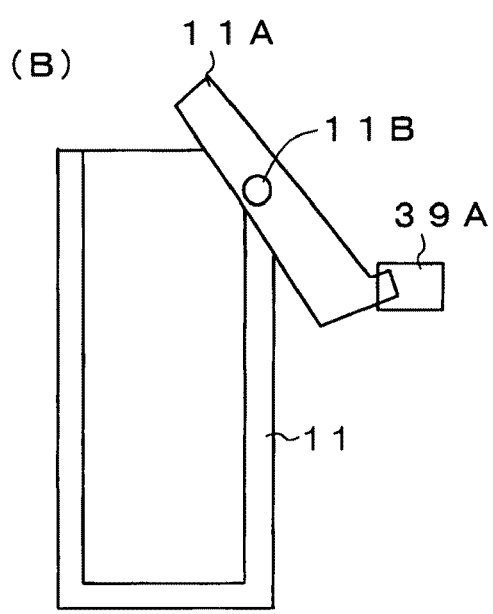
(B)
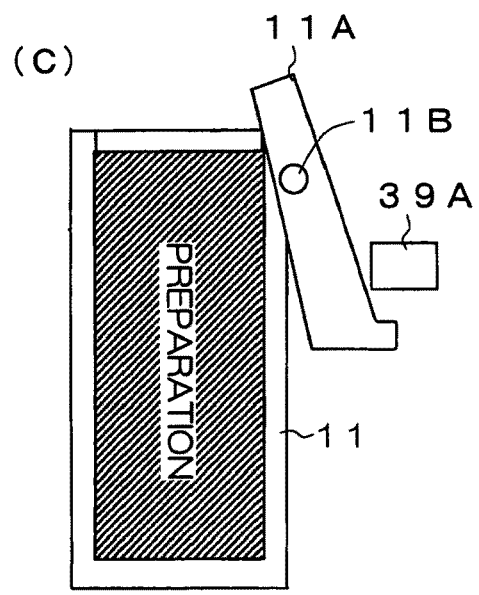
(C)

FIG. 5

ABC.txt

| NUMBER | FILE NAME | MAGNIFICATION | DIAPHRAGM STOP | X COORDINATE | Y COORDINATE | FOCAL POINT POSITION | BRIGHTNESS OF ILLUMINATION | TYPE OF OPERATION | COMMENT | DATE | TIME | OBSERVER NAME |
|---|---|---|---|---|---|---|---|---|---|---|---|---|
| 1 | DEF001.bmp | 5 | 75 | 1200 | 100 | 3450 | 120 | REGISTRATION OF MICRO IMAGE | | | | |
| 2 | DEF002.bmp | 10 | 75 | 1000 | 2000 | 3000 | 180 | 〃 | | | | |
| 3 | DEF003.bmp | 10 | 75 | 900 | 3510 | 3020 | 180 | 〃 | | | | |
| 4 | DEF004.bmp | 20 | 75 | 2700 | 2680 | 3070 | 200 | 〃 | | | | |
| 5 | DEF005.bmp | 20 | 75 | 3200 | 4200 | 3075 | 200 | 〃 | | | | |
| 6 | DEF006.bmp | 40 | 75 | 500 | 850 | 3200 | 240 | | | | | |

INFORMATION OF IMAGING POSITION

INFORMATION OF OBSERVATION HISTORY

FIG. 13
(A)
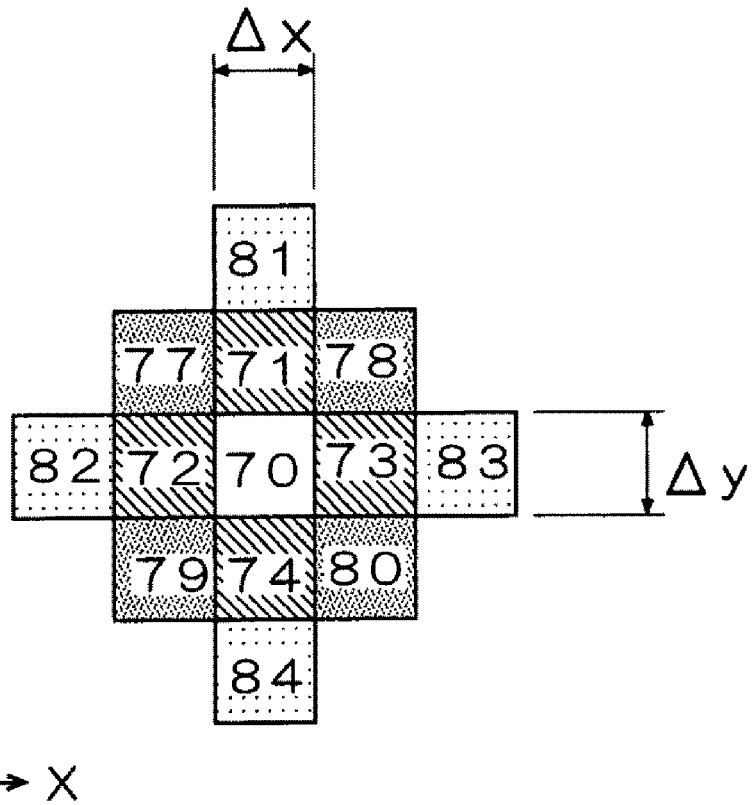
(B)
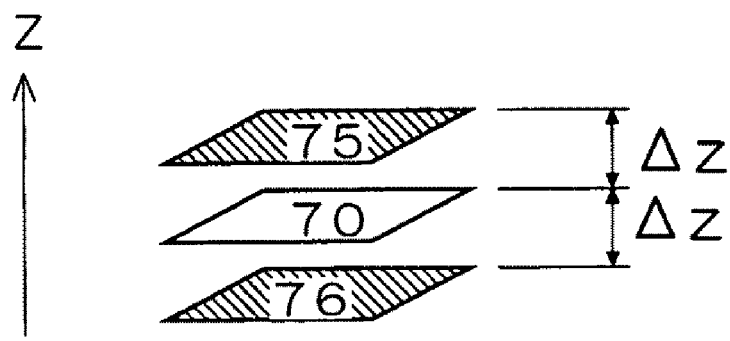

FIG. 18
(a)
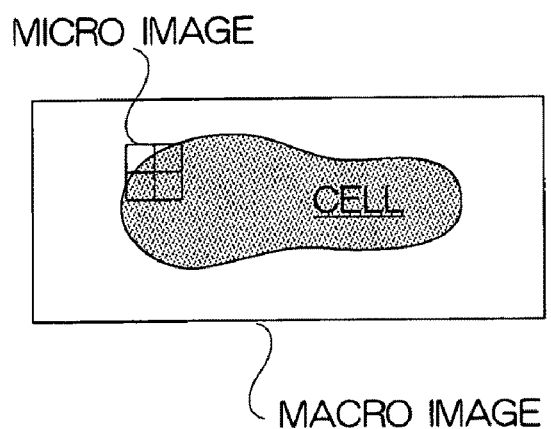
(b)
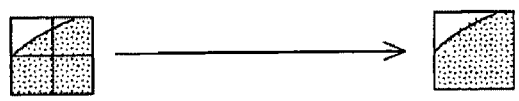
TILING PROCESSING
FIG. 19
(a)
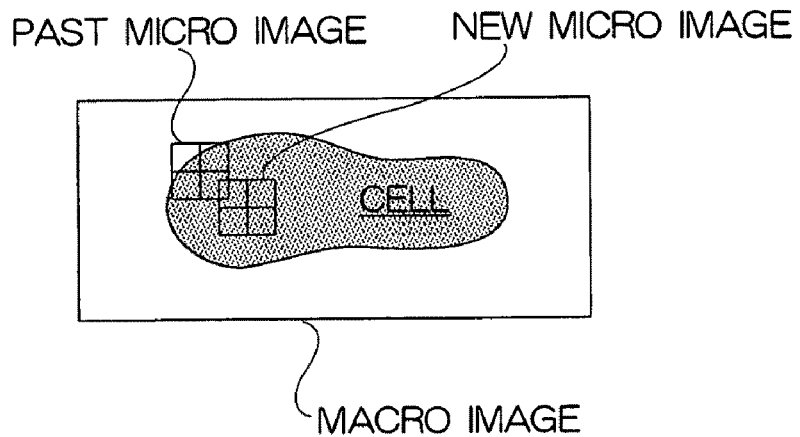
(b)
TILING PROCESSING

MICROSCOPE SYSTEM AND IMAGE PROCESSING METHOD USED FOR OBSERVATION OF A SPECIMEN

TECHNICAL FIELD

The present invention relates to a microscope system and an image processing method which are used for observation of a specimen.

BACKGROUND ART

Conventionally, there are known microscope systems in which moving of a stage mounting a specimen, switching of magnification of an objective lens, and the like are electrically controllable. Further, there are also known technologies (specimen scanning systems) in which such a microscope system is used to take in magnified images of a specimen sequentially while finely scanning the entire area of the specimen, and a large number of obtained magnified images are connected by software processing, thereby generating a high definition image of the entire area of the specimen (for example, refer to Patent document 1). Making an image of the entire area of a specimen enables virtual observation even when a valuable specimen is not at hand.

Patent document 1: U.S. Pat. No. 6,101,265 (National Publication of Translated Patent Application No. 2002-514319)

DISCLOSURE OF THE INVENTION

Problems to be Solved by the Invention

However, in the aforementioned specimen scanning systems, since a high definition image is generated by finely scanning the entire area of a specimen, it requires a considerable amount of time for generating the image. Further, the amount of data of a generated image also becomes enormous. Therefore, it was hard to say that the aforementioned specimen scanning systems are practical. There is also a problem that, once an operation of the specimen scanning system is started, the microscope system is occupied for a long period of time until the operation completes.

An object of the present invention is to provide a microscope system and an image processing method which are practical and capable of imaging a specimen efficiently by a short period of time and also ensuring reduction of the data amount of a generated image.

Means for Solving the Problems

A microscope system according to the present invention is a microscope system having a microscope and an imaging apparatus which images a specimen on a stage of the microscope, and the system includes: an acquiring section which acquires identification information of the specimen on the stage; a storage section which stores a macro image and a micro image of the specimen which are imaged by the imaging apparatus in a correlated manner with the identification information of the specimen acquired by the acquiring section; and an additional storing section which judges whether the specimen is a registered specimen already stored in the storage section or not based on the identification information of the specimen, and additionally stores in the storage section when the specimen is judged as the registered specimen a micro image of the specimen newly imaged by the imaging apparatus in a correlated manner with a macro image of the registered specimen.

Further, it is preferable that the above-described microscope system further includes: a first display section which displays a macro image of the specimen; a second display section which displays a micro image of the specimen; and a display control section which performs display control of the first display section and the second display section, in which the display control section judges whether the specimen is a new specimen or a registered specimen for which the micro image correlated with the macro image is already stored in the storage section based on the identification information of the specimen acquired by the acquiring section, and when the specimen is judged as a new specimen, the display control section displays a macro image of the specimen imaged by the imaging apparatus on the first display section and displays a micro image correlated with the macro image of the specimen displayed on the first display section on the second display section; and when the specimen is judged as the registered specimen, the display control section reads the macro image of the specimen stored in the storage section and displays the macro image on the first display section, and switches the micro image displayed on the second display section to either a micro image correlated with the macro image of the specimen stored in the storage section or a micro image of the specimen being imaged by the imaging apparatus.

Further, it is preferable that the above-described microscope system further includes: a first display section which displays a macro image of the specimen; a second display section which displays a micro image of the specimen; and a display control section which performs display control of the first display section and the second display section, in which the display control section judges whether the specimen is a new specimen or a registered specimen for which the micro image correlated with the macro image is already stored in the storage section based on the identification information of the specimen acquired by the acquiring section, and when the specimen is judged as a new specimen, the display control section displays a macro image of the specimen imaged by the imaging apparatus on the first display section and displays a micro image correlated with the macro image of the specimen displayed on the first display section on the second display section; and when the specimen is judged as the registered specimen, the display control section reads the macro image of the specimen stored in the storage section and displays the macro image on the first display section, and further displays by switching to either an off-line mode in which the micro image displayed on the second display section is a micro image correlated with the macro image of the specimen stored in the storage section or an on-line mode in which the micro image displayed on the second display section is a micro image of the specimen being imaged by the imaging apparatus.

Further, it is preferable that in the above-described microscope system, the storage section stores information of observational history for the specimen in a correlated manner in addition to the identification information, the macro image and the micro image; and the additional storage section updates the information of observational history when a micro image displayed on the second display section is stored.

Further, it is preferable that in the above-described microscope system, the information of observational history includes information of date and time regarding a storage operation of a micro image displayed on the second display section and information of an observer name.

Further, it is preferable that in the above-described microscope system, the information of observational history includes identification information of the microscope system.

Further, it is preferable that in the above-described microscope system, the storage section stores information of observational history for the specimen in a correlated manner in addition to the identification information, the macro image and the micro image, and the system further includes: a third display section which reads from the storage section a macro image and a micro image correlated with predetermined identification information in accordance with an instruction from outside and displays the macro image and the micro image; and an updating section which updates the information of observational history correlated with the predetermined identification information in accordance with an instruction from outside during displaying by the third display section.

Further, it is preferable that in the above-described microscope system, the storage section performs correlation including information of an imaging position and an imaging condition of each of micro images when correlating the macro image and the micro image, and the system further includes: a fine control section which reads and reproduces from the storage section the imaging position and imaging condition of a micro image correlated with identification information acquired by the acquiring section, and thereafter fine controls the imaging position and imaging condition when the specimen as an observation target is mounted on the stage; and a control section which generates a micro image of the specimen by imaging the specimen as an observation target in a state of after being fine controlled by the fine control section, and additionally stores in the storage section the micro image in a correlated manner with the macro image displayed on the first display section and the identification information acquired by the acquiring section.

Further, it is preferable that the above-described microscope system further includes: a position recognition marker section which detects and stores a position recognition marker of the specimen from an image of the specimen imaged by the imaging apparatus; and a positional correction section which judges whether the specimen is a new specimen or a registered specimen for which the macro image and the micro image are already stored in the storage section based on the identification information of the specimen acquired by the acquiring section, and corrects when the specimen is judges as the registered specimen a mounting position on the stage of the specimen mounted on the stage to a regular position based on the position recognition marker stored in the position recognition marker section.

Further, it is preferable that in the above-described microscope system, the additional storing section combines a plurality of micro images adjacent to each other out of past micro images correlated with a macro image of the registered specimen and/or a micro image newly imaged by the imaging apparatus, and stores a combined image as one micro image in the storage section.

An image processing method according to the present invention is an image processing method for a microscope system which includes a microscope and an imaging apparatus which images a specimen on a stage of the microscope, and the method includes: an acquiring step of acquiring identification information of the specimen on the stage; a storing step of storing a macro image and a micro image of the specimen which are imaged by the imaging apparatus in a correlated manner with the acquired identification information of the specimen; and an additional storing step of judging whether the specimen is a registered specimen already stored in the storing step or not based on the identification information of the specimen, and additionally storing when the specimen is judged as the registered specimen a micro image of the specimen newly imaged by the imaging apparatus in a correlated manner with a macro image of the registered specimen.

Further, it is preferable that in the above-described image processing method, the microscope system includes a first display section which displays a macro image of the specimen and a second display section which displays a micro image of the specimen, and performs display control of the first display section and the second display section, and the method further includes: judging whether the specimen is a new specimen or a registered specimen corresponding to the macro image and the micro image which are already stored based on the acquired identification information of the specimen; when the specimen is judged as a new specimen, displaying a macro image of the specimen imaged by the imaging apparatus on the first display section and displaying a micro image of the specimen imaged by the imaging apparatus on the second display section; and when the specimen is judged as the registered specimen, reading the stored macro image of the specimen stored in the storage section and displaying the macro image on the first display section, and further switching the micro image displayed on the second display section to either a micro image of the specimen stored in the storing step or a micro image of the specimen being imaged by the imaging apparatus.

Effect of the Invention

According to the present invention, it is possible to provide a microscope system and an image processing method which are practical and capable of imaging a specimen efficiently by a short period of time and also ensuring reduction of the data amount of a generated image.

BRIEF DESCRIPTION OF THE DRAWINGS

FIG. 2 is a schematic view showing an inserted state of a specimen 10A in a microscope system 10;

FIG. 5 is a view explaining an example of the condition file;

FIG. 13 is a view explaining neighborhood positions in x axis, y axis, z axis respectively in the automatic history registration processing;

FIG. 18 is a view explaining an example of combining micro images by tiling and storing them; and FIG. 19 is a view explaining an example of combining micro images by tiling and storing them.

BEST MODE FOR CARRYING OUT THE INVENTION

Hereinafter, an embodiment of the present invention will be explained in detail using the drawings.

Figure 1:
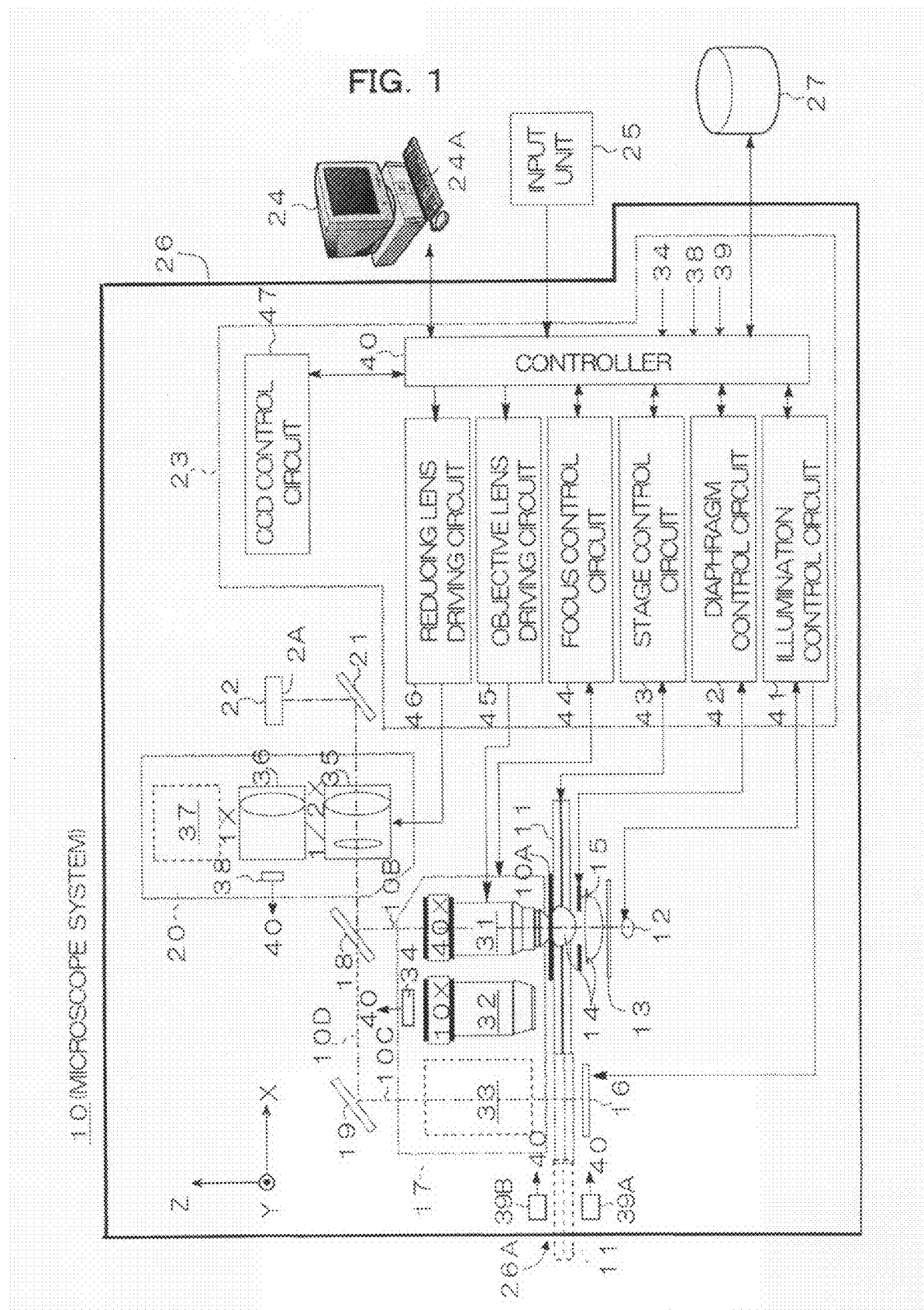
FIG. 1 is an overall structure view of a microscope system of a present embodiment.

A microscope system 10 of the present embodiment is constituted of, as shown in FIG. 1, a stage member 11 mounting a specimen 10A as an observation target, an illumination member (12 to 16) illuminating the specimen 10A, an imaging member (17 to 21) forming a magnified image of the specimen 10A, a CCD camera 22 imaging the magnified image of the specimen 10A, a control member 23, a computer 24, and an input unit 25.

Among them, the stage member 11, the illumination member (12 to 16), the imaging member (17 to 21), the CCD camera 22, and the control member 23 are accommodated in a case 26 of the microscope system 10 (refer to FIG. 2A), and the computer 24 and the input unit 25 are arranged outside the case 26. The microscope system 10 is a microscope system in a box shape having a CCD camera inside. To the microscope system 10, an external storage unit 27 is attached. The external storage unit 27 is a hard disk for example.

Further, inside the case 26 of the microscope system 10, the illumination member (12 to 16) is arranged below the stage member 11, and the imaging member (17 to 21) and the CCD camera 22 are arranged above the stage member 11. The microscope system 10 is an apparatus for observing the specimen 10A by transillumination.

Moreover, the specimen 10A is a prepared specimen. On the preparation part of the specimen 10A, a barcode (not shown) for identification is affixed as a sticker.

Next, the respective components (12 to 25) of the microscope system 10 will be explained individually.

The stage member 11 is constituted of an electronic stage capable of moving in x direction and y direction and a counter detecting an x position and a y position of an electric stage (both not shown). The stage member 11 is also capable of moving to the outside via an opening 26A of the case 26 (refer to FIG. 2A). The route of movement of the stage member 11 to the outside/from the inside of the case 26 transverses two observational optical paths 10B, 10C of the microscope system 10.

In this embodiment, for simplifying the explanation, the position (including rotation) of the specimen 10A on the stage member 11 is always the same (even when re-mounted). In other words, the specimen 10A can be positioned on the stage member 11 with good repeatability. In this case, it is conceivable that coordinates of the stage member 11 and coordinates of the specimen 10A always match.

To detect whether a preparation (specimen 10A) is mounted on the stage member 11 or not, a preparation holder 11A is provided on the stage member 11, and a sensor 39A is provided below the opening 26A inside the case 26 as shown in FIG. 1, and FIGS. 2B and 2C. The preparation holder 11A is rotatable about an axis 11B, and when a preparation is not mounted on the stage member 11 (state of FIG. 2B), one end is located in the sensor 39A. Then, when a preparation enters the inside of the case 26 from the outside in a state of being mounted on the stage member 11 (state of FIG. 2C), the other end is pushed by the preparation and the one end goes outside the sensor 39A. Accordingly, the sensor 39A detects whether the preparation (specimen 10A) is present or not on the stage member 11 according to the presence of the one end of the preparation holder 11A.

Further, to read a barcode (not shown) of a specimen 10A when the specimen 10A is mounted on the stage member 11, a sensor 39B is provided inside the case 26 (above the opening 26A for example). A detection signal by the sensor 39B is outputted to a controller 40 of the control member 23. The controller 40 obtains identification information of the specimen 10A based on the output from the sensor 39B.

The identification information may not necessarily be arranged to be detected by the sensor 39B, and may be externally inputted by the user. The identification information is information for identifying whether the preparation (specimen 10A) mounted on the stage is a preparation already registered in the storage unit 27 or not. The sensor 39B and the controller 40 together correspond to "acquiring section" in claims.

Specifically, the identification information of the specimen 10A may be, for example, ID information peculiar to a preparation stored in an IC tag fixed to the preparation. Further, as another identification information, image data representing the contour of a sample (cell piece) on the preparation may be used. In this case, the contour of the sample on the preparation is read, and it is judged whether it is an already registered preparation or not by an image matching method.

The stage member 11 is connected to the controller 40 via a stage control circuit 43 of the control member 23. Based on a control signal from the controller 40, the stage control circuit 43 moves the electric stage of the stage member 11 in the x direction and the y direction to adjust an observation position for the specimen 10A by the stage member 11. Further, the value of the counter of the stage member 11 is read and a signal related to the x position and the y position of the electric stage is outputted to the controller 40.

The illumination member (12 to 16) is constituted of an illumination light source 12, a diffuser plate 13, a condenser lens 14, an aperture diaphragm 15, which are arranged on one observational optical path 10B, and an illumination light source 16, which is arranged on the other observational optical path 10C.

A light radiated from the one illumination light source 12 is evened by the diffuser plate 13 and condensed by the condenser lens 14 to be incident on a partial region (observation point) of the specimen 10A on the observational optical path 10B via the aperture diaphragm 15. Then, the light passed through this partial region (observation point) is lead to the imaging member (17 to 21).

A light radiated from the other illumination light source 16 is incident on the specimen 10A on the observational optical path 10C. At this time, the specimen 10A is illuminated in a plane form on a half area thereof. Then, also the light passed through this half area is lead to the imaging member (17 to 21). The illumination light source 16 is used for observing a wide range including the specimen 10A (entire preparation) with equal magnification.

The illumination light sources 12, 16 are connected to the controller 40 via a illumination control circuit 41 of the control member 23 to be controlled thereby.

The diaphragm 15 is connected to the controller 40 via the diaphragm control circuit 42 of the control member 23 to be controlled thereby.

The imaging member (17 to 21) is constituted of an objective lens member 17, mirrors 18, 19, a reducing lens member 20, and a mirror 21. Here, the mirror 18 is arranged on the observational optical path 10B, and the mirror 19 is arranged on the observational optical path 10C. An observational optical path 10D after reflection by the mirrors 18, 19 is in common. The mirror 21 is an optical element arranged on the observational optical path 10D for returning an image reversed by the mirrors 18, 19 to a front image.

The objective lens member 17 is constituted of a 40× objective lens 31, a 10× objective lens 32, a through hole 33, and a sensor 34. Then, either one of the objective lenses 31, 32 can be inserted in the observational optical path 10B. The type (31 or 32) of the objective lens inserted in the observational optical path 10B is sensed by the sensor 34. The through hole 33 is arranged on the observational optical path 10C.

The objective lens member 17 is connected to the controller 40 via the focus control circuit 44 and the objective lens driving circuit 45 of the control member 23 to be controlled thereby.

The reducing lens member 20 is constituted of a ½× reducing lens 35, 1× reducing lens 36, a through hole 37, and a sensor 38. Then, any one of the reducing lenses 35, 36 and the through hole 37 can be inserted in the observational optical path 10D. The sensor 38 is for sensing the type (35 or 36) of the reducing lens inserted in the observational optical path 10D.

The reducing lens member 20 is connected to the controller 40 via a reducing lens driving circuit 46 of the control member 23 to be controlled thereby.

The CCD camera 22 is a two-dimensional imaging element using a CCD (charge coupled device) and has a plurality of light receiving parts arranged two-dimensionally in x and y directions. The CCD camera 22 images an image of the specimen 10A formed on a predetermined surface 2A and outputs an image signal. The destination of the output is a CCD control circuit 47 of the control member 23.

Based on a control signal from the controller 40, the CCD control circuit 47 outputs a timing signal to the CCD camera 22 to control it.

To the controller 40, not only the respective circuits (41 to 47) constituting the control member 23, the sensor 34 of the objective lens member 17, the sensor 38 of the reducing lens member 20 are connected, but also the computer 24, the input unit 25, and the external storage unit 27 are connected.

The computer 24 displays an observational image, an operation menu, or the like on screens 50, 60 (FIG. 3), and also combines a role of a history database server for observational images and so on. In the history database server, a falsification preventing scheme such as an electronic watermark is provided for preventing falsification of history data. Image data itself and acquiring information (setting of the apparatus and time), browsing information (time and location on an image), written comment, processing (filtering or the like) are registered as a set in the history database server. It is preferable for the history database server that a database server is built on another PC and managed in connection therewith, but it may also be included in the apparatus.

In the case that image data registered once in the database is processed, the original image data is always kept so that the original image data can be referred any time. Further, it is desirable that the database is of an additionally storing type structure which records all of browsing, written comments, and actions regarding modification of data such as processing, and the history of these browsing and modification actions cannot be deleted or falsified. For example, a password method is adopted for identifying a person accessing the database, or a falsification preventing scheme such as electronic watermark is implemented for image data.

In the external storage unit 27, a file of an observational image and so on are stored. The history database of the computer 24 and the external storage unit 27 correspond together to "storage section" in claims. The input unit 25 is a GUI (graphical user interface) for operation displayed on the computer 24, and includes a keyboard 24A connected to the computer 24 (or a keyboard created on the computer 24 by software).

When taking in a digital signal from the CCD control circuit 47 of the control member 23, the controller 40 stores it once in a frame memory, and thereafter outputs it to the screens 50, 60 (FIG. 3) of the computer 24. As a result, in the screens 50, 60 of the computer 24, a current still image of the specimen 10A is displayed. Further, in the screens 50, 60, a past specimen image (history image) read by the controller 40 from the external storage unit 27 via the history database of the computer 24 is also displayed.

Here, the current still image of the specimen 10A will be explained. An image caused by a light passing through the objective lens (31 or 32) on the observational optical path 10B and the reducing lens (35 or 36) on the observational optical path 10D and reaching the CCD camera 22 (hereinafter referred to as a "micro image") is a magnified image of a partial region (observation point) of the specimen 10A, and is displayed on a split region 51 of the screen 50 of the computer 24. The split region 51 is a display region for a micro image.

Components related to display of a micro image is the optical elements (12 to 15, 31, 32, 18) on the observational optical path 10B, the optical elements (35, 36, 21) on the observational optical path 10D, the CCD camera 22, the CCD control circuit 47, the controller 40, and the split region 51 of the screen 50 of the computer 24, which correspond together to "second display section" in claims. These components are a section displaying a micro image by imaging a specimen 10A mounted on the stage member 11.

Imaging conditions (magnification of the objective lens, magnification of the reducing lens, diaphragm stop, focal point position, brightness of illumination) and an imaging position (x and y positions of the stage member 11) when displaying a micro image can be adjusted by the respective circuits (41 to 47) constituting the control member 23. Note that the display magnification of the micro image is determined by a product of magnification (5×, 10×, 20×, 40×) of the magnifying optical system inserted in the observational optical paths 10B, 10D when the CCD camera 22 images a magnified image of the specimen 10A and digital zoom magnification (1× to 2× for example) set when the CCD camera 22 outputs an image signal.

Further, an image caused by a light passing through the through hole 33 on the observational optical path 10C and the through hole 37 on the observational optical path 10D and reaching the CCD camera 22 (hereinafter referred to as "macro image") is an image of equal magnification of a wide range (entire preparation) including the specimen 10A, and is displayed on a split region 61 of the screen 60 of the computer 24. The split region 61 is a display region for the macro image. In the split region 61, rectangular frames 66, 67 which will be described later are displayed overlapping with the macro image.

Components related to the display of the macro image are the optical elements (16, 19) and the through hole 33 on the observational optical path 10C, the optical element (21) and the through hole 37 on the observational optical path 10D, the CCD camera 22, the CCD control circuit 47, the controller 40, and the split region 61 of the screen 60 of the computer 24, which correspond together to "first display section" in claims. These components are a section displaying a macro image by imaging a specimen 10A mounted on the stage member 11.

Thus, when the specimen 10A is mounted on the stage member 11, basically a current micro image is displayed on the split region 51 of the screen 50 of the computer 24, and a current macro image is displayed on the split region 61 of the screen 60. However, instead of these current micro image and macro image, it is also possible to display a past micro image or macro image (history image) read by the controller 40 from the external storage unit 27 via the history database of the computer 24 on the split regions 51, 61. The screen 50 and the screen 60 may be split and displayed simultaneously on one display screen, or may be displayed selectively alternately. Alternatively, they may be displayed on two display apparatuses respectively.

Figure 4:
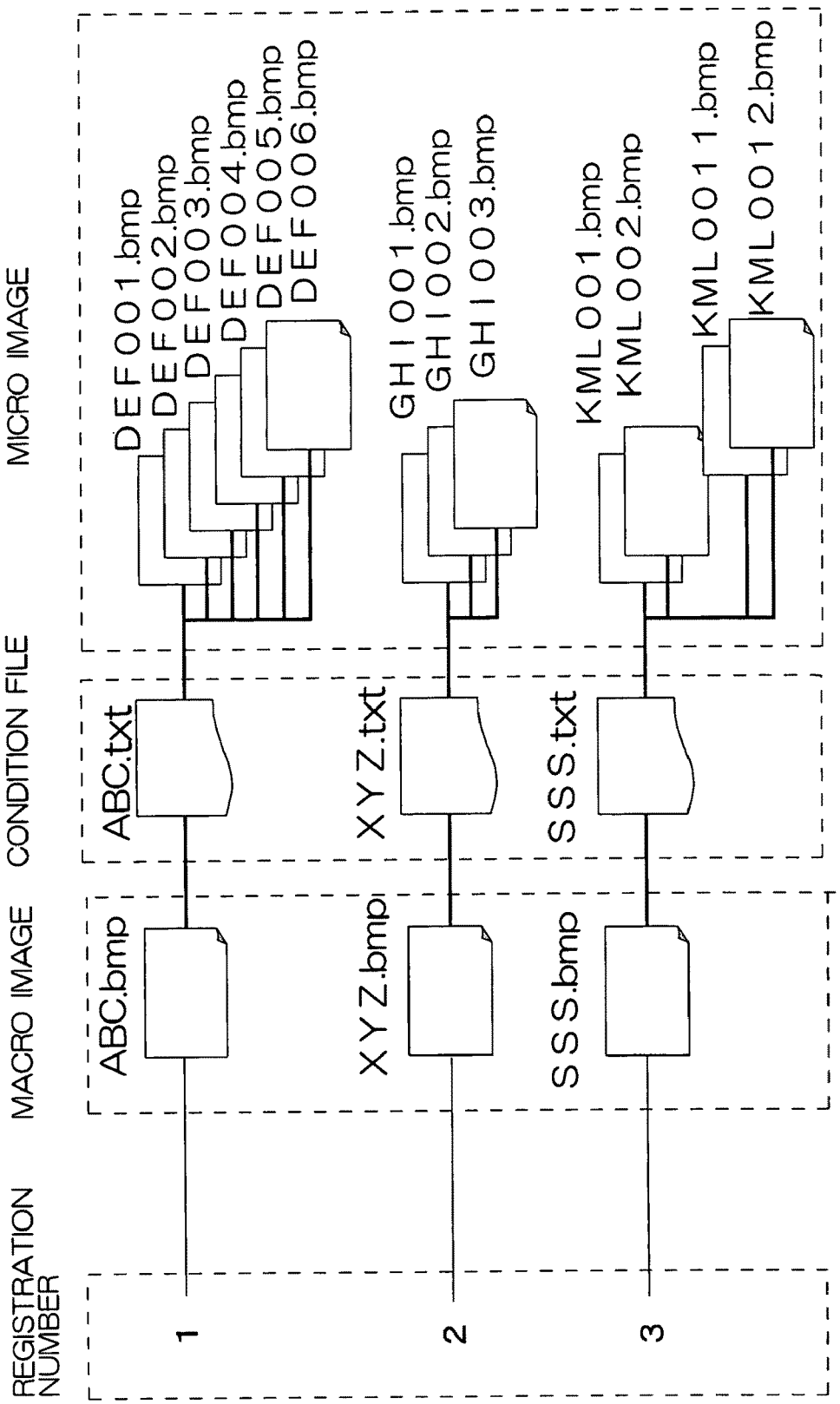
FIG. 4 is a view explaining correlation of a macro image, a condition file, and a micro image stored in a history database of the computer 24 and an external storage unit 27.

Past micro images and macro images (history images) are, as shown in FIG. 4, correlated with each other via a condition file (for example, name: ABC.txt) in the history database of the computer 24 and the external storage unit 27. Further, the macro image (for example, name: ABC.bmp) is also correlated with a registration number (1 for example) given according to identification information of the specimen 10A. Incidentally, in this embodiment, one macro image (for example, name: ABC.bmp) and one condition file (for example, name: ABC.txt) are correlated with one registration number (1 for example), and further a large number of micro images (for example, name: DEF001.bmp or the like) are correlated thereto.

In this manner, a registration number is given according to the identification number of the specimen 10A so as not to overlap with each other in the history database of the computer 24 and the external storage unit 27, and correlating of this registration number with a macro image and a micro image is performed for every registration number (namely, for every specimen). Further, the correlating of a registration number with a macro image and a micro image is equivalent to correlation of identification information of a specimen 10A with a macro image and a micro image. Giving of a registration number is performed automatically by the controller 40.

Here, file names of a macro image and a micro image (for example, ABC.bmp, DEF001.bmp or the like) are names determined by the controller 40 arbitrarily at random with alphanumeric characters so as not to allow overlapping with each other. Date and time of registration may be adopted as the file names. Further, not being limited to an example of designating a file name automatically in this manner, a file name may be designated by an observer. The extension of a file name is not limited to "bmp", which may be of a different format. Further, the name of a condition file (for example, ABC.txt) is automatically determined by the controller 40 (such as the same name but having an extension "txt") in a correlated manner with the file name (for example, ABC.bmp) of a macro image.

Moreover, the condition file (for example, name: ABC.txt) is a file which correlates, as shown in FIG. 5, the file name of a micro image (for example, name: DEF001.bmp), an imaging position (x and y positions of the stage member 11), and imaging conditions (magnification, diaphragm stop, focal point position, brightness of illumination), and also correlates information of observational history with respect to the specimen 10A (type of operation, comment, date, time, name of observer). Among respective items in the condition file, those other than comments included in the information of observational history are ones automatically written by the controller 40. The comments are information inputted by the observer with the keyboard 24A or the like.

Further, among respective items in the condition file, an item essential to correlating of a micro image and a macro image is information of an imaging position (x and y positions of the stage member 11). It is conceivable that the imaging position (x and y positions of the stage member 11) represents the position of a micro image on a macro image without performing any kind of coordinate conversion processing, when the coordinate system of the stage member 11 and the coordinate system of the specimen 10A always match as in this embodiment. Therefore, by correlating a macro image and a micro image together with an imaging position (x and y positions of the stage member 11), the partial region of a macro image corresponding to a micro image can be grasped at any time.

Then, when correlation information as in FIG. 4 and FIG. 5 is already stored in the history database of the computer 24 and the external storage unit 27, past macro images and micro images (history images) read by the controller 40 therefrom are displayed on the split regions 51, 61, 62, 64 of the screens 50, 60 (FIG. 3) of the computer 24, respectively.

Specifically, a list of macro images is displayed on the split region 62, one macro image selected from this list is displayed on the split region 61, and a list of micro images correlated with this macro image is displayed on the split region 64. Further, partial regions of a macro image corresponding to the respective micro images on the list in the split region 64 (namely, imaging positions of the respective micro images) are displayed as rectangular frames 66, 67, . . . on the split region 61. Further, one micro image selected from the list in the split region 64 is displayed under magnification on the split region 51 of the screen 50.

Further, specimen information (such as registration number) of the macro image which is selected from the list in the split region 62 and displayed on the split region 61 is displayed on the split region 63. Patient information, comments and so on included in the specimen information are information inputted by the observer with the keyboard 24A or the like. Further, information of the micro image selected from the list in the split region 64 and displayed on the split region 51 (such as comments in a condition file shown in FIG. 5) is displayed on the split region 65.

Note that the micro images displayed on the list in the split region 64 may be all the micro images stored in the history database of the computer 24 and the external storage unit 27 (all the micro images correlated with the macro image on the split region 61), but when they are categorized using items (titles 1, 2, . . . on a split region 69) included in the condition file shown in FIG. 5, it is also possible to display only a part of the micro images on the split region 64.

Incidentally, a split region 52 of the screen 50 is a display region for an operation menu and so on, and shows whether a specimen 10A is mounted (on line) or not mounted (off line) on the stage member 11. Further, on the split region 52, there are provided a load button 53, an image button 54, a read macro button 55, a reproduce button 56, an image neighborhood button 57, and an input box 58.

When the observer clicks the above described buttons (53 to 57) with a mouse or the like, various instructions are inputted from the input unit 25 to the controller 40. Then, the controller 40 outputs a control signal to the respective circuits (41 to 47) of the control member 23 according to an instruction from the outside so as to control respective parts of the microscope system electrically. Further, sending and receiving files and data are performed with the history database of the computer 24 and the external storage unit 27. Moreover, when the observer inputs a comment (characters and/or symbols) in the aforementioned input box 58, the controller 40 updates the contents of storage (such as the condition file of FIG. 5) in the external storage unit 27 via the history database of the computer 24.

Next, the operation of the microscope system 10 of this embodiment will be explained using flowcharts of FIG. 6 to FIG. 12. When processing of a flowchart of FIG. 12 is explained, FIG. 13 will be referred.

When the power of the microscope system 10 is turned on and an observer logins to the microscope system 10, the controller 40 initializes respective parts of the microscope system 10 and starts control by the flowcharts of FIG. 6 to FIG. 12. At this time, on the split region 62 of the screen 60 of the computer 24, a list of macro images already stored in the history database of the computer 24 and the external storage unit 27 is displayed.

(Button Input Detection Processing)

First of all, button input detection processing (S1 to S10) shown in FIG. 6 will be explained.

Figure 3:
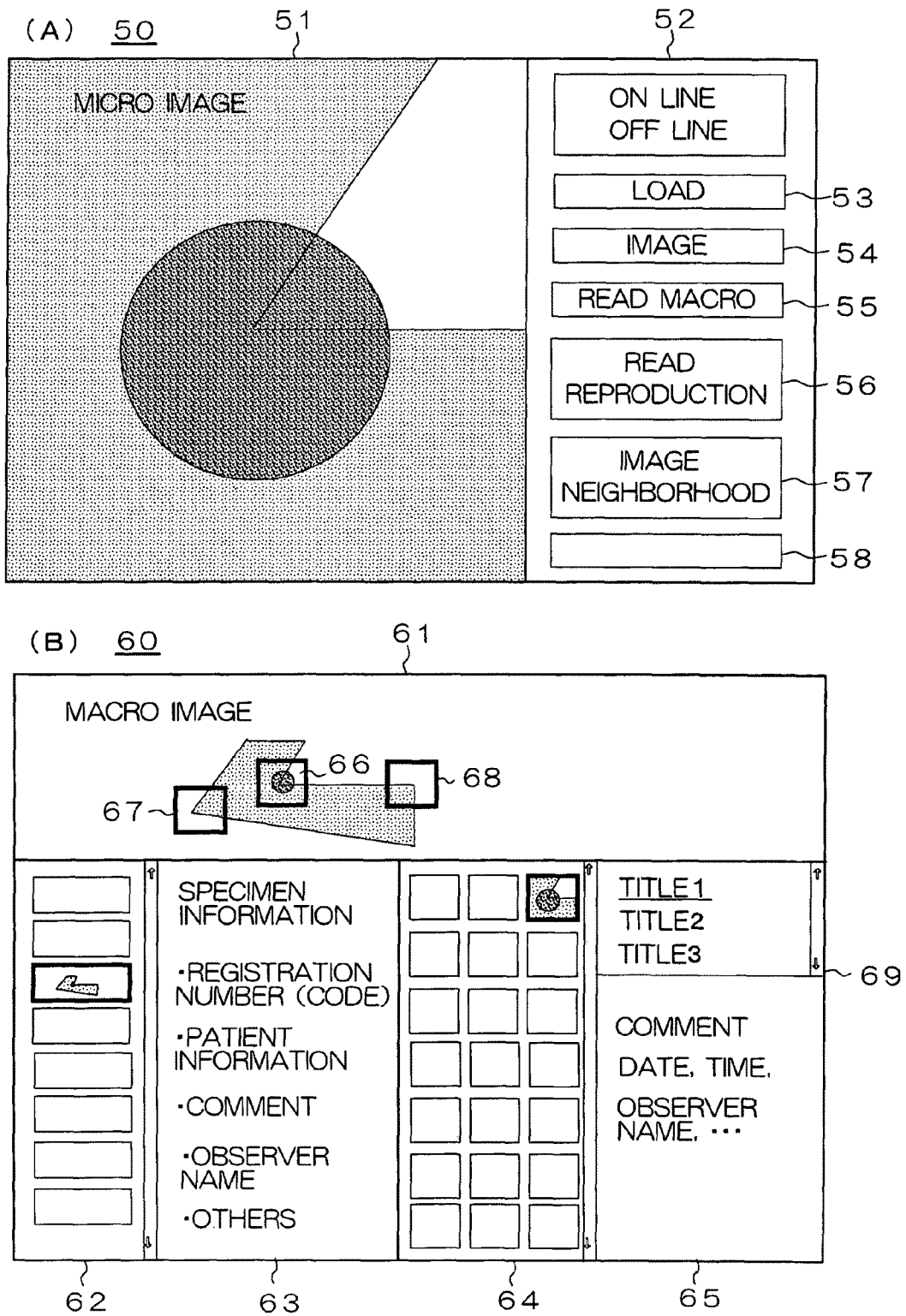
FIG. 3 is a view explaining screens 50, 60 of a computer 24.

The controller 40 monitors whether the load button 53, the image button 54, the read macro button 55, the reproduce button 56, or the image neighborhood button 57 of FIG. 3 is pressed or not in respective Steps S1 to S5.

Then, when the load button 53 is pressed (Yes in S1), load processing of Step S6 (details shown in FIG. 7) is executed. When the image button 54 is pressed (Yes in S2), registration processing of Step S7 (details shown in FIG. 9) is executed. When the read button 55 for macro image is pressed (Yes in S3), read processing of a macro image in Step S8 (details shown in FIG. 10) is executed. When the reproduce button 56 is pressed (Yes in S4), reproduction processing of Step S9 (details shown in FIG. 11) is executed. When the image neighborhood button 57 is pressed (Yes in S5), automatic history registration processing of Step S10 (details shown in FIG. 12) is executed.

Note that either in the registration processing (details shown in FIG. 9) when the image button 54 is pressed or in the automatic history registration processing (details shown in FIG. 12) when the image neighborhood button 57 is pressed, registration of a micro image of a specimen 10A is performed. However, to clarify the difference therebetween, a flag indicating "registered by observer" is set on a micro image registered using the registration processing (details shown in FIG. 9), but the same flag is not set on a micro image registered using the automatic history registration processing (details shown in FIG. 12).

(Load Processing)

Next, load processing of FIG. 7 (S11 to S25) will be explained.

When the load button 53 is pressed, the controller 40 expels the stage member 11 to the outside via the opening 26A of the case 26 (state in FIG. 2) in Step S11. At this time, the observer can mount a specimen 10A on the top of the stage member 11. Further, when a specimen 10A is already mounted, the specimen 10A can be removed from the top of the stage member 11.

Thereafter, when the load button 53 is pressed again (Yes in Step S12), the controller 40 brings the stage member 11 inside via the opening 26A (Step S13). At this time, the specimen 10A is also brought inside with the stage member 11. Otherwise, only the stage member 11 which became empty by removing the specimen 10A is brought inside.

Further, when the stage member 11 is brought inside the case 26, the controller 40 detects whether a preparation (specimen 10A) is present on the stage member 11 or not according to the output of the sensor 39A (Step S14). Then, when the preparation (specimen 10A) is not present (No in Step S14), the load processing is terminated and the flow returns to the button input detection processing of FIG. 6.

On the other hand, when the preparation (specimen 10A) is present (Yes in Step S14), the controller 40 reads a barcode on the preparation based on the output of the sensor 39B, and obtains identification information of the specimen 10A (Step S15). Then, inquiry to the history database of the computer 24 (refer to FIG. 4) is made so as to judge the presence of a registration number corresponding to the identification information of the specimen 10A (Step S16). When the registration number is not present in the history database (No in S16), the controller 40 proceed to processing of Step S17 for performing a new registration of the specimen 10A mounted on the stage member 11.

In Step S17, the illumination light source 16 is lighted and the mirror 18 is retracted, and the through hole 37 of the reducing lens member 20 is inserted in the observational optical path 10D. Then, when the specimen 10A reaches the observational optical path 10C, the specimen 10A is imaged by way of dividing into two shots, and a macro image is taken in. The macro image is stored once in the frame memory and displayed on the split region 61 of the computer 24 (Step S18).

Then, a registration number is newly given according to the identification information of the specimen 10A obtained in the above-described Step S15 (Step S19), a file name (for example, ABC.Bmp) is given to the macro image displayed on the split region 61 (Step S20), and they are correlated with each other and stored in the history database of the computer 24 and the external storage unit 27 (FIG. 4). Further, in next Step S21, a condition file (for example, name: ABC.Txt) as in FIG. 5 is created, correlated with the aforementioned macro image, and stored in the history database of the computer 24 and the external storage unit 27 (FIG. 4).

As a result of performing the processing of Steps S17 to S21, in the history database of the computer 24 and the external storage unit 27, the new registration number, the file of the macro image (for example, name: ABC.Bmp), and the condition file (for example, name: ABC.txt) are correlated and newly registered. At this point of time, the number of registered micro images is still 0, and there is no writing to respective items of the condition file. By such a new registration, a new macro image is added to the list on the split area 62, and specimen information (such as registration number) is displayed on the split area 63.

On the other hand, when the registration number corresponding to the identification information of the specimen 10A is judged to be present in the history database in the processing of Step S16 (Yes in S16), the controller 40 executes processing of Steps S22 to S24. The processing of Steps S22 to S24 corresponds to processing of reading/displaying a past macro image or micro image (history image) from the external storage device 27 via the history database of the computer 24 when the specimen 10A mounted on the stage member 11 is already registered.

First, in Step S22, a macro image correlated with the registration number is read. Then, the read macro image is displayed on the split region 61 of the computer 24 (Step S23). At this time, on the split region 63, specimen information (such as registration number) of the read macro image is displayed. Thereafter, in Step S24, read processing of a past micro image correlated with the read macro image is executed (details are shown in S31 to S39 of FIG. 8). Note that explanation of Step S25 is given after the following explanation of FIG. 8 (namely, detailed explanation of Step S24).

(Read Processing of Micro Image)

Figure 8:
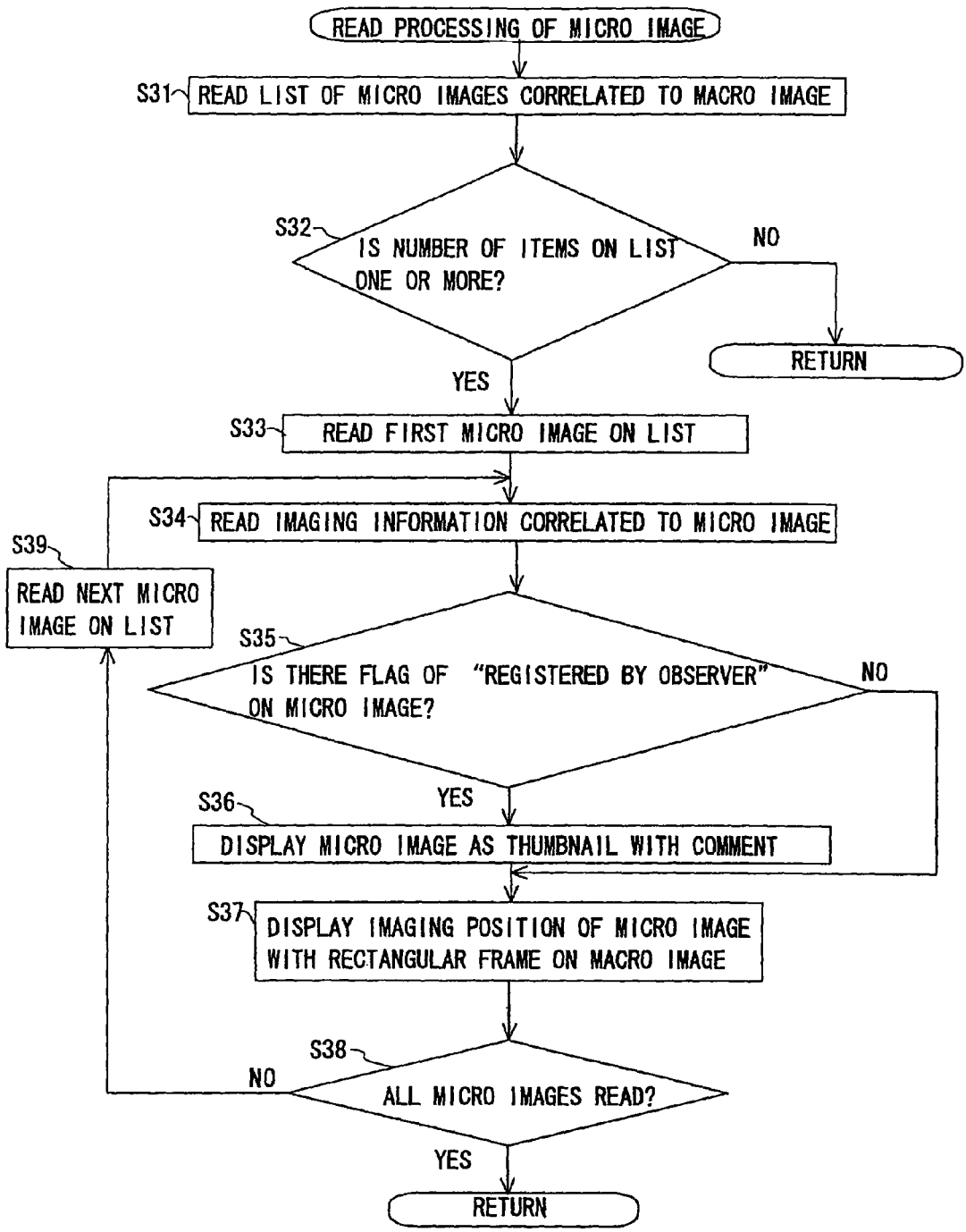
FIG. 8 is a flowchart showing a procedure of read processing of a micro image.

In Step S31 of FIG. 8, a list of micro images correlated with the read macro image is read. Then, when the number of items on the list (namely, the number of registered past micro images) is 0 (No in Step S32), this read processing is terminated. In this case, nothing is displayed on the split region 64 on the screen 60 of the computer 24, resulting in the same state as the state after the above-described new registration (S17 to S21) is completed.

Further, when the number of items on the list (namely, the number of registered past micro images) is one or more (Yes in Step S32), a file name related to the first micro image on the list is obtained, and the micro image is read from the external storage unit 27 (Step S33). In next step S34, a condition file (FIG. 5) is referred and imaging information (imaging position, imaging condition, observational history, and so on) correlated with the read micro image is read.

In next Step S35, based on the read imaging information, it is judged whether the flag indicating "registered by observer" is set on the micro image or not (namely, whether or not it is a micro image registered using the registration processing of FIG. 9, which will be described later). As a result of judgment, when the flag is set (Yes in S35), the micro image read in the step S33 is displayed as a thumbnail on the split region 64 of the screen 60 of the computer 24 (Step S36). Further, a comment and so on correlated with the micro image are displayed on the split region 65. Note that when the flag is not set (No in S35), the micro image is one registered using the automatic history registration processing of FIG. 12, which will be described later, and the thumbnails are not displayed.

Thereafter, based on information of an imaging position (x and y positions of the stage member 11) out of the imaging information read in Step S34, the position of the micro image read in Step S33 is displayed by a rectangular frame (for example, a rectangular frame 66) overlapping on the macro image on the split region 61 (Step S37). At this time, to distinguish the micro image which is displayed by the thumbnail (registered in the registration processing of FIG. 9, which will be described later) on the split region 64 and a micro image which is not displayed by a thumbnail (registered in the automatic history registration processing of FIG. 12, which will be described later), it is preferable that rectangular frames are given different colors for example.

In Step S38, it is judged whether reading of all the number of items on the list of micro images is completed or not, and when there is any micro image which is not read yet (No in S38), the next micro image on the list is read from the external storage unit 27 in Step S39. Then, the same processing of Steps S34 to S38 as described above is repeated. When all the read micro images on the list are read (Yes in S38), this read processing is completed. Thus, the processing of Step S24 of the load processing of FIG. 7 is completed.

As a result of performing processing of Steps S22 to S24, a macro image of the registration number according to the identification information of the specimen 10A mounted on the stage member 11 is displayed on the split region 61 of the screen 60 of the computer 24, and when a past micro image correlated with this macro image exists (registered in the registration processing of FIG. 9, which will be described later), it is displayed by a thumbnail on the split region 64. Further, in the split region 63, specimen information (such as registration number) of the macro image on the split region 61 is displayed.

Figure 7:
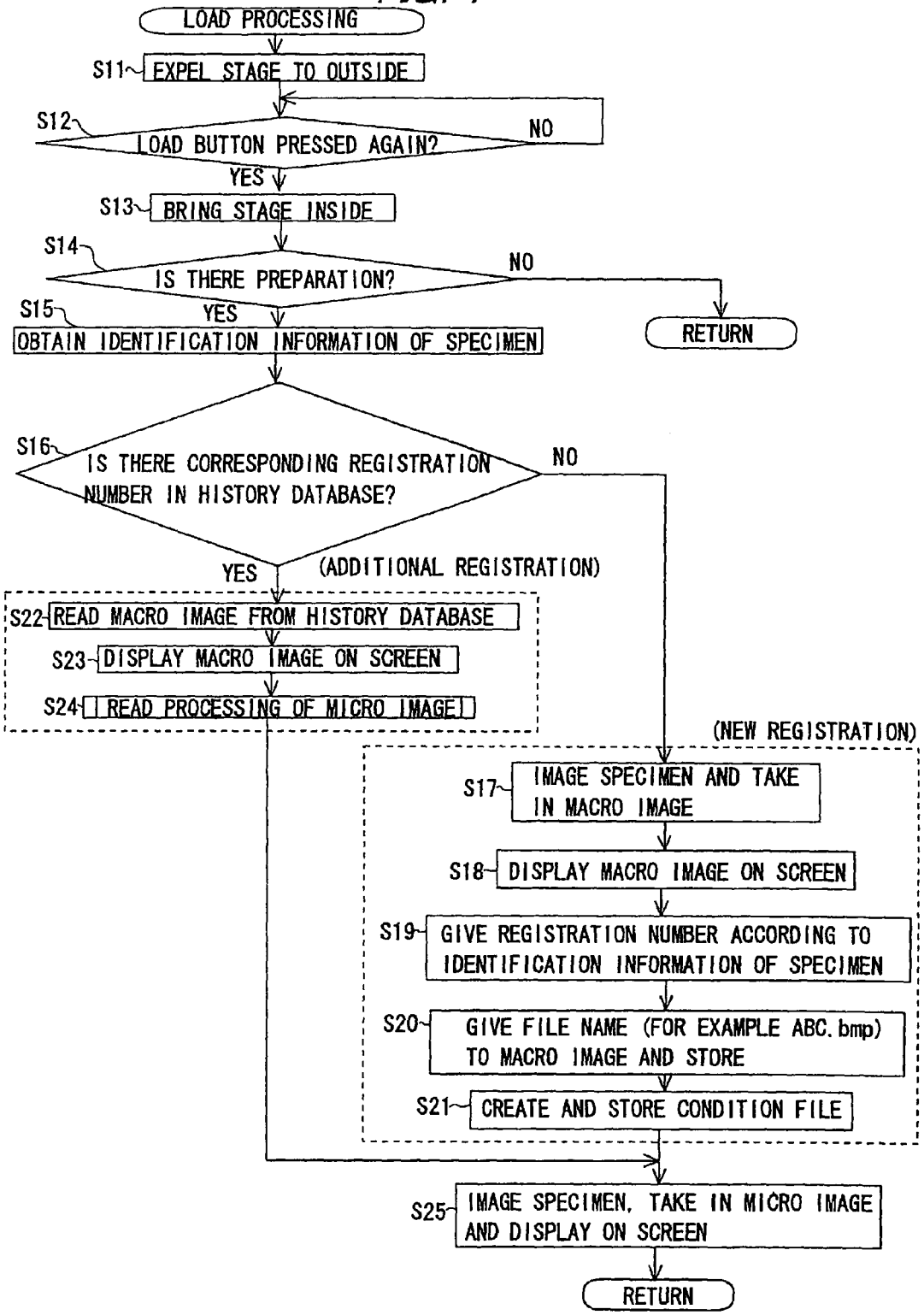
FIG. 7 is a flowchart showing a procedure of load processing.

Thus, in the load processing of FIG. 7, depending on whether the registration number corresponding to the identification information of the specimen 10A exists or not in the history database of the computer 24, the processing of Steps 517 to S21, or the processing of Steps S22 to S24 is performed, and thereafter, the flow proceeds to processing of Step S25. In Step S25, when the stage member 11 further moves and the specimen 10A reaches the observational optical path 10B, the controller 40 lights the illumination light source 12, and inserts the mirror 18 in the observational optical path 10D, thereby setting an observation state of a partial region of the specimen 10A. At this time, the controller 40 images the specimen 10A to take in a micro image, and displays it on the split region 51 of the computer 24.

Figure 6:
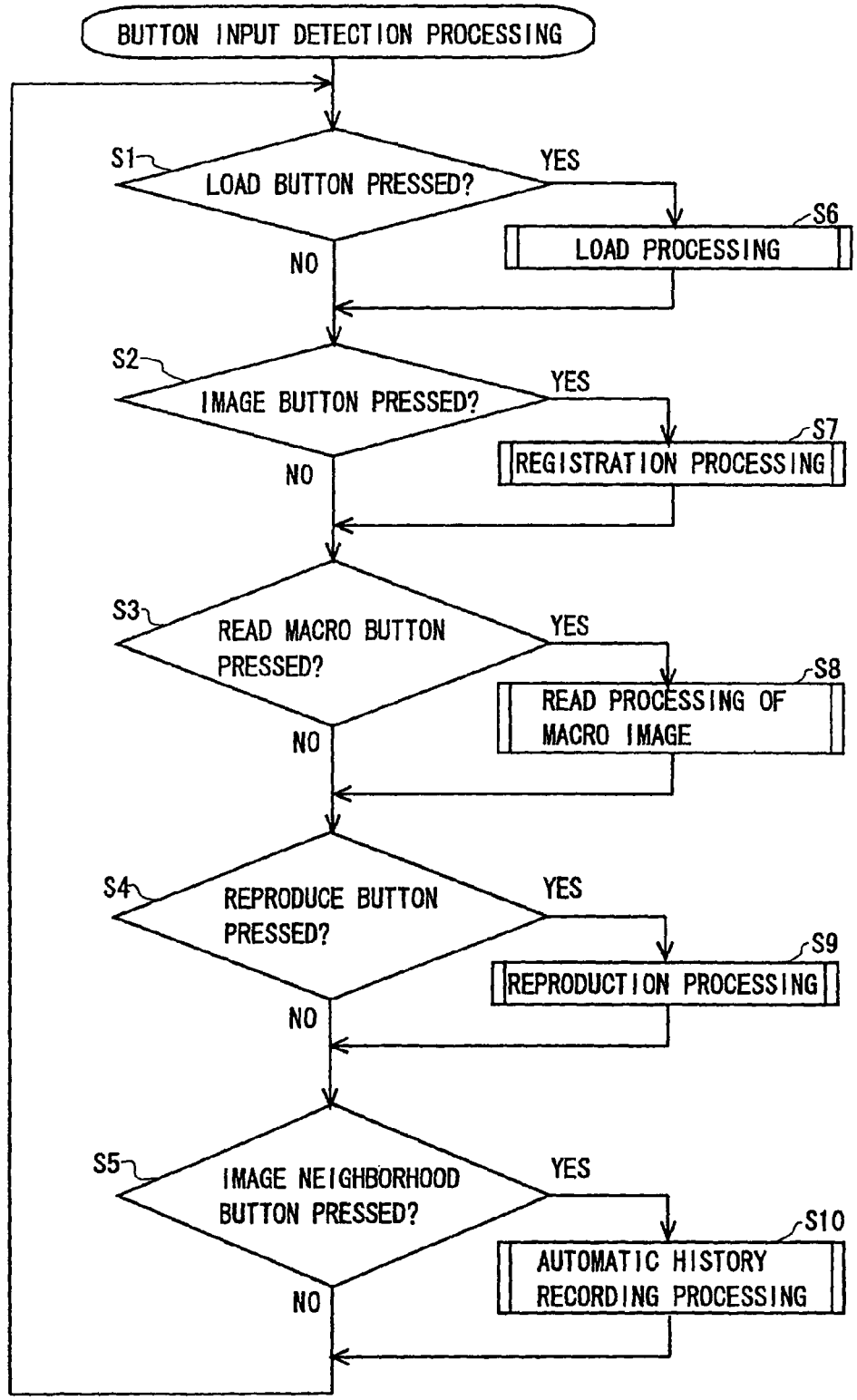
FIG. 6 is a flowchart showing a procedure of button input detection processing.

When the load processing of FIG. 7 is completed, the controller 40 returns to the button input detection processing of FIG. 6. In this state, the controller 40 controls electrically the respective parts of the microscope system 10 according to an instruction from the outside, images the specimen 10A while changing an imaging condition, an imaging position, and the like of the micro image displayed on the split region 51, thereby updating the micro image. Note that the imaging position for the micro image can be specified by clicking a part desired to be magnified for observation in the split region 61 (macro image).

(Registration Processing)

Next, registration processing (S41 to S46) of FIG. 9 will be explained.

When the image button 54 is pressed, the controller 40 judges in Step S41 whether the number of registrations for the specimen 10A on the stage member 11 has already reached the maximum (limited value in the history database of the computer 24) or not. Then, only when there is still a room for registration (No in S41), processing of Step S42 and thereafter is performed.

In Step S42, the micro image displayed on the split region 51 is given a file name (for example, DEF001.bmp), and is correlated with the registration number obtained in Step S15 of FIG. 7 and the macro image displayed on the split region 61, and stored in the history database of the computer 24 and the external storage unit 27 (FIG. 4). At this time, an electronic watermark is given to the micro image for preventing falsification.

Moreover, in Step S43, the imaging position of the micro image (x and y positions of the stage unit) and imaging conditions thereof (magnification of the object lens member, magnification of the reduced lens unit, diaphragm stop, focal point position, brightness of illumination) are obtained from the respective circuits (41 to 47) and the sensors 34, 38. Then, the file name, the imaging position and the imaging conditions of the micro image are written in a condition file (for example, name: ABC.txt) correlated with the registration number obtained in Step S15 of FIG. 7.

Further, in Step S44, information of observational history for the specimen 10A (type of operation, comment, date, time, name of observer) is updated and displayed on the split region 65. When updating the information of observational history, it is arranged such that a person able to write is identified by a password or the like for preventing falsification. Among the information of observational history, the type of operation (for example, registration of a micro image), date, time, and name of observer are information automatically written by the controller 40. The data and time are for example the date and time when the image button 54 is pressed. The name of observer is, for example, a login name to the microscope system 10. On the other hand, the comment included in the information of observational history is information such as characters or symbols inputted by the observer in the input box 58 of the computer 24 using the keyboard 24A or the like.

Next, the controller 40 displays the micro image stored in Step S42 by a thumbnail on the split region 64 of the screen 60 of the computer 24 (Step S45). Moreover, based on the information of the imaging position (x and y positions of the stage member 11) obtained in Step S43, the position of the micro image displayed on the split region 51 is displayed overlapping on the macro image on the split region 61 by a rectangular frame (for example, the rectangular frame 66) (Step S46).

Figure 9:
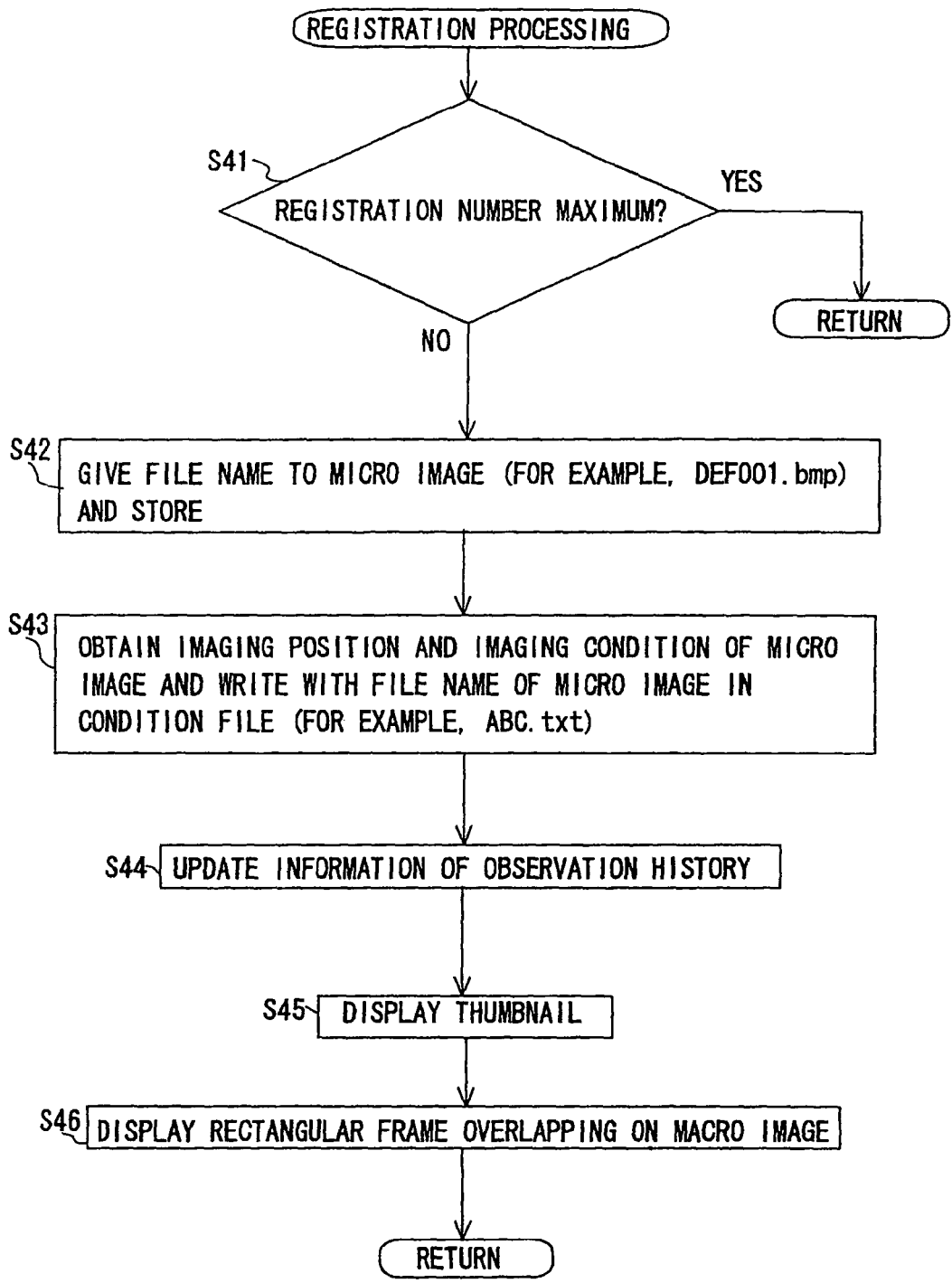
FIG. 9 is a flowchart showing a procedure of registration processing.

When the registration processing of FIG. 9 is completed in this manner, the controller 40 returns to the button input detection processing of FIG. 6. Then, every time the image button 54 is pressed, the registration processing (S41 to S46) of FIG. 9 is repeated and a list of micro images is added further. Specifically, rather than taking in micro images (magnified images) sequentially on the entire region of the specimen 10A as in conventional specimen scanning systems, only a micro image (micro image of a part converged by the observer) displayed on the split region 51 is taken in and added to the list when the image button 54 is pressed.

In the microscope system 10 of this embodiment, since a convergence position of the specimen 10A is determined by the observer himself/herself, a micro image at this position is taken into the history database of the computer 24 and the external storage unit 27, and also a micro image of any part which is not particularly important is not stored, the specimen 10A can be imaged efficiently in a short period of time as compared to conventional specimen scanning systems, which ensures reduction of the data amount of a generated image.

Such effects are similar not only in the case where a new specimen 10A is mounted on the stage member 11, but also in the case where the specimen 10A for which one or more micro images are already registered is re-mounted on the stage member 11. In this case, based on the registration number corresponding to the identification information of the specimen 10A obtained in the above-described Step S15 of FIG. 7, a past macro image or micro image (history image) is read from the external storage unit 27 via the history database of the computer 24 by the processing of Steps S22 to S24 thereafter.

Then, when the image button 54 is pressed (according to an instruction from the outside), by the registration processing (S41 to S46) of FIG. 9 the micro image displayed on the split region 51 (the micro image of the part converged by the observer) is correlated with the registration number corresponding to the identification information of the specimen 10A obtained in Step S15 of FIG. 7 and the macro image displayed on the split region 61, and is stored additionally in the history database of the computer 24 and the external storage unit 27 (additional writing). Therefore, also in the case of re-mounting, the specimen 10A can be imaged efficiently in a short period of time, thereby ensuring reduction of the data amount of a generated image.

Thus, in the microscope system 10 of this embodiment, when a specimen 10A is imaged, only a needed part can be stored as a high definition micro image only when it is needed, and it is possible to return to the specimen 10A whenever an additional storage thereof is desired, to thereby additionally store only a part which is newly needed as a high definition micro image. Stored data are only the high definition micro image of a part converged by the observer and a macro image (equal magnification image) of the specimen 10A, and a data amount thereof does not become enormous as in conventional specimen scanning systems.

(Read Processing of Macro Image)

Further, by imaging an important part (part converged by the observer) of the specimen 10A in association with the entire image of the specimen 10A, virtual observation becomes possible even when a valuable specimen 10A is not at hand. Next, virtual observation in a state that a specimen 10A is not mounted (off line) on the stage member 11 will be explained. This observation also applies to the case of virtually observing a specimen different from the specimen 10A mounted on the stage member 11.

Figure 10:
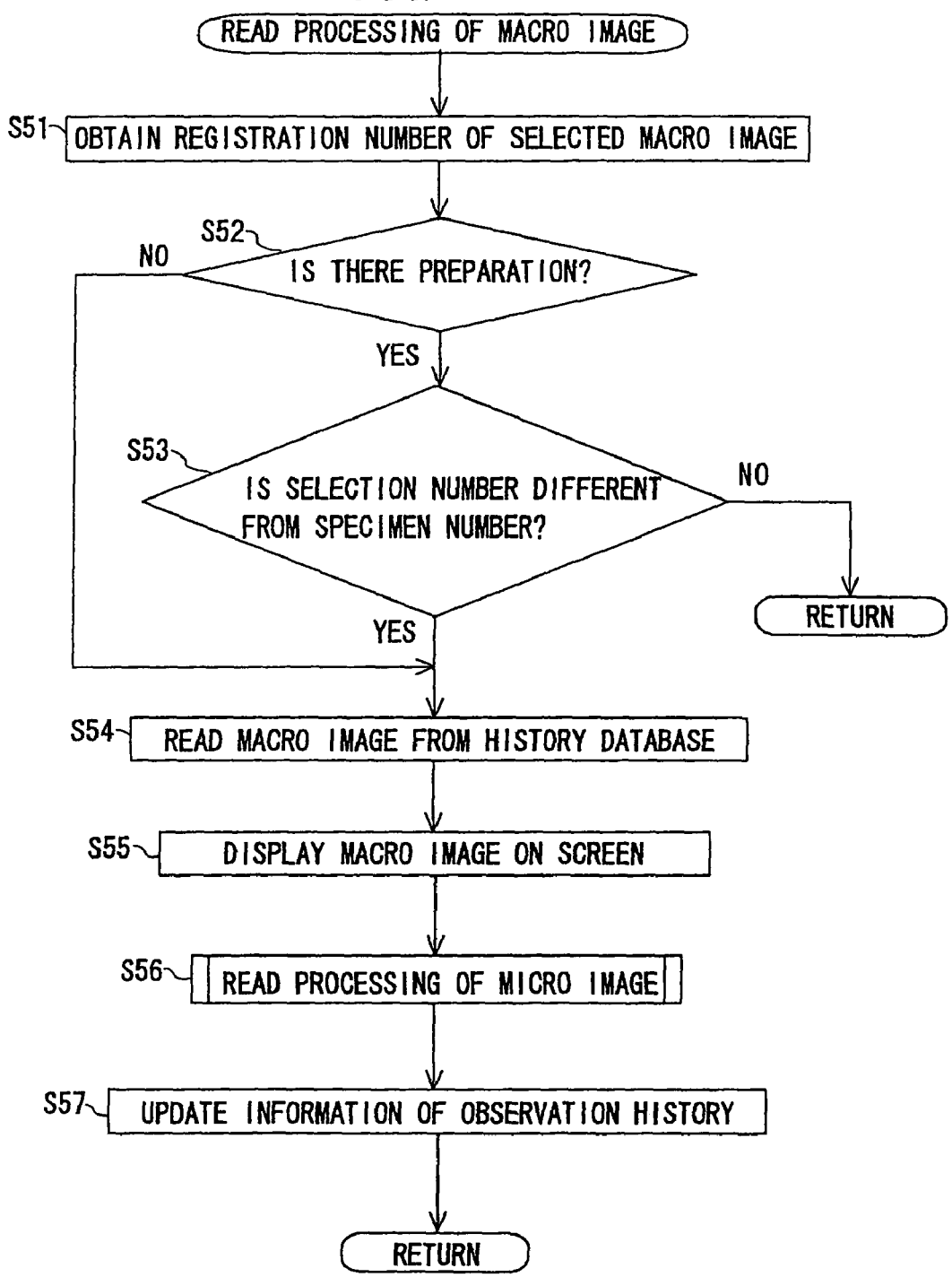
FIG. 10 is a flowchart showing a procedure of read processing of a macro image.

When the observer selects one macro image from the list displayed on the split region 62 of the screen 60 of the computer 24 and presses the read macro button 55 in the split region 52, the controller 40 executes read processing (S51 to S57) of a macro image of FIG. 10.

In Step S51, to recognize the selected macro image in the list on the split region 62 when the read macro button 55 is pressed, a registration number correlated with the macro image is obtained from the input unit 25. Next, in Step S52, it is detected whether a preparation (specimen 10A) is present on the stage member 11 or not. When the preparation (specimen 10A) is not present (No in Step S52), the flow proceeds to Step S54 without performing processing of next Step S53.

Further, when the preparation (specimen 10A) is present (Yes in S52), the flow proceeds to processing of Step S53, and it is judged whether the registration number (selection number) obtained in Step S51 is different or not from the registration number (specimen number) corresponding to identification information of the specimen 10A. When the two registration numbers match (No in S53), the desired macro image is already displayed on the split region 61 and the list of micro images correlated with the macro image is displayed on the split region 64, and hence this read processing is terminated.

On the other hand, when the two registration numbers are different (Yes in S53), as well as when the preparation (specimen 10A) is not present on the stage member 11 (No in S52), the flow proceeds to processing of Step S54, and a macro image correlated with the registration number obtained in Step S51 is read from the external storage unit 27 via the history database of the computer 24. Then the read macro image is displayed on the split region 61 of the computer 24 (Step S55). At this time, in the split region 63, specimen information (such as registration number) of the read macro image is displayed on the split region 63.

Thereafter in Step S56, read processing (S31 to S39 of FIG. 8) of a past micro image correlated with the read macro image is executed. Consequently, a past micro image (registered in registration processing of FIG. 9) correlated with the macro image is displayed by a thumbnail on the split region 64. In this state, when the observer selects one micro image from the list on the split region 64, the micro image can be displayed on the split region 51.

Further, when the observer inputs a comment (characters and/or symbols) in the input box 58 of the computer 24 using the keyboard 24A or the like, the controller 40 updates in Step S57 information of observational history (refer to FIG. 5) correlated with the macro image on the split region 61. Further, when the observer moves upward/downward, left/right, focus, magnification, or the like virtually, the information of observational history is updated based on the operation thereof. It is preferable that a flag is set on such additional history to distinguish it from observational history (S44 of FIG. 9) while being on line.

Further, in a virtual operation (changing magnification or the like), at a position where a micro image is not obtained, a micro image may be displayed by digital zooming of the macro image, or it may be configured such that displaying of a micro image is inhibited by means of restriction by software. Further, during such virtual observation, it is preferable to prevent falsification of a macro image or a micro image (history image) stored in the external storage unit 27.

In this manner, by executing the read processing (S51 to S57) of a macro image of FIG. 10, a high definition micro image can be observed virtually even when a valuable specimen 10A is not at hand. Moreover, a history image of a different specimen can be read and displayed (transition from on-line to off-line) even when observing a certain specimen 10A (during imaging), and thus the microscope system 10 is not occupied by imaging of the specimen 10A, thereby making the microscope system 10 practical.

Inversely, transition from off-line to on-line can also be done smoothly. In this case, it may be performed such that, after the read processing (S51 to S57) of a macro image of FIG. 10, the controller 40 clearly shows identification information of a needed specimen 10A to prompt the observer for loading, thereby starting the load processing (FIG. 7) of the needed specimen 10A. Otherwise, the observer may start the load processing (FIG. 7) of the needed specimen 10A arbitrarily. In either case, the transition from off-line to on-line can be done smoothly, which makes the microscope system 10 practical.

(Reproduction Processing)

Moreover, in the microscope system 10 of this embodiment, it is also possible to reproduce an imaging position (x and y positions of the stage member 11) and imaging conditions (magnification of the objective lens member, magnification of the reducing lens member, diaphragm stop, focal point position, brightness of illumination), which are written in a condition file.

Figure 11:
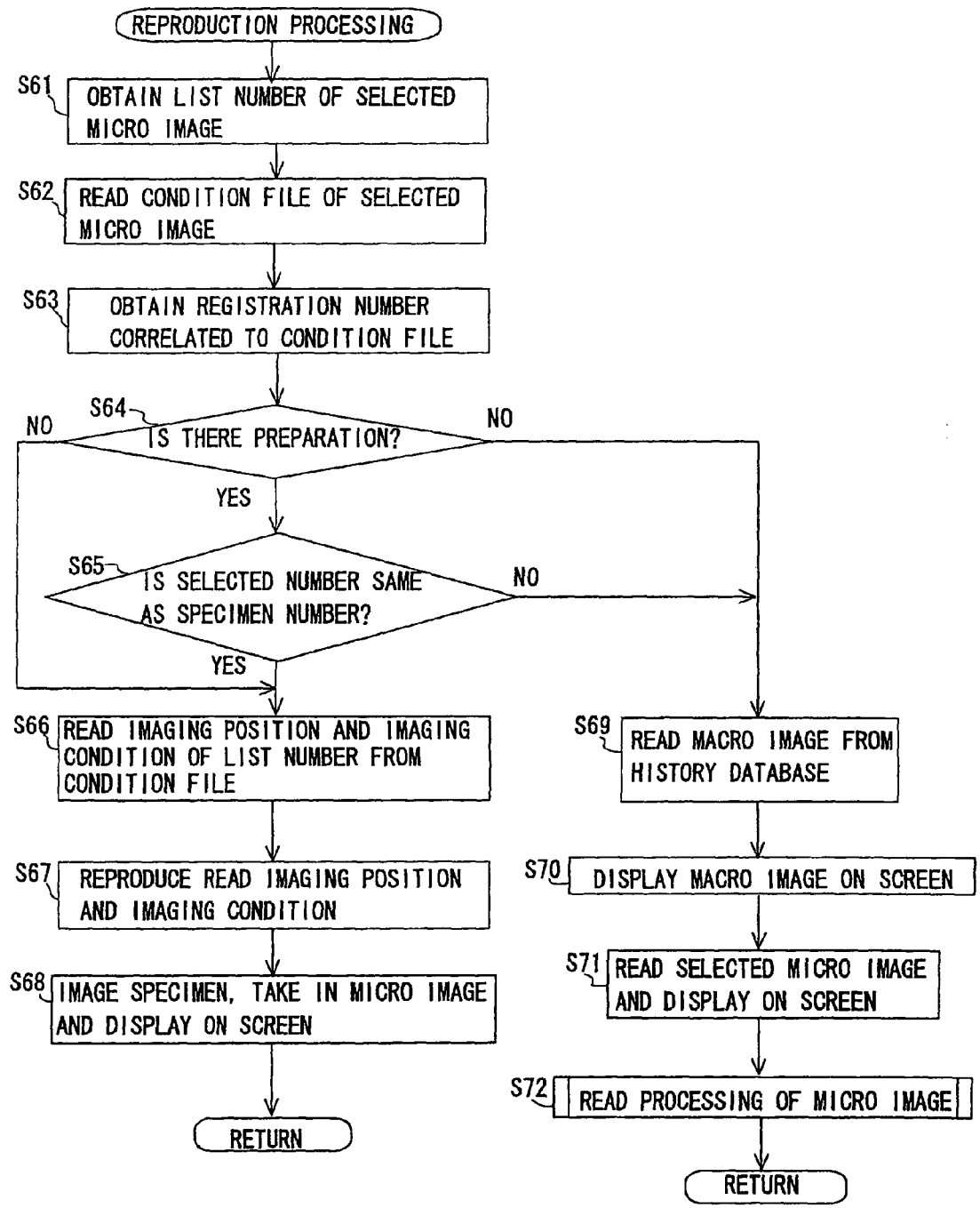
FIG. 11 is a flowchart showing a procedure of reproduction processing.
Figure 12:
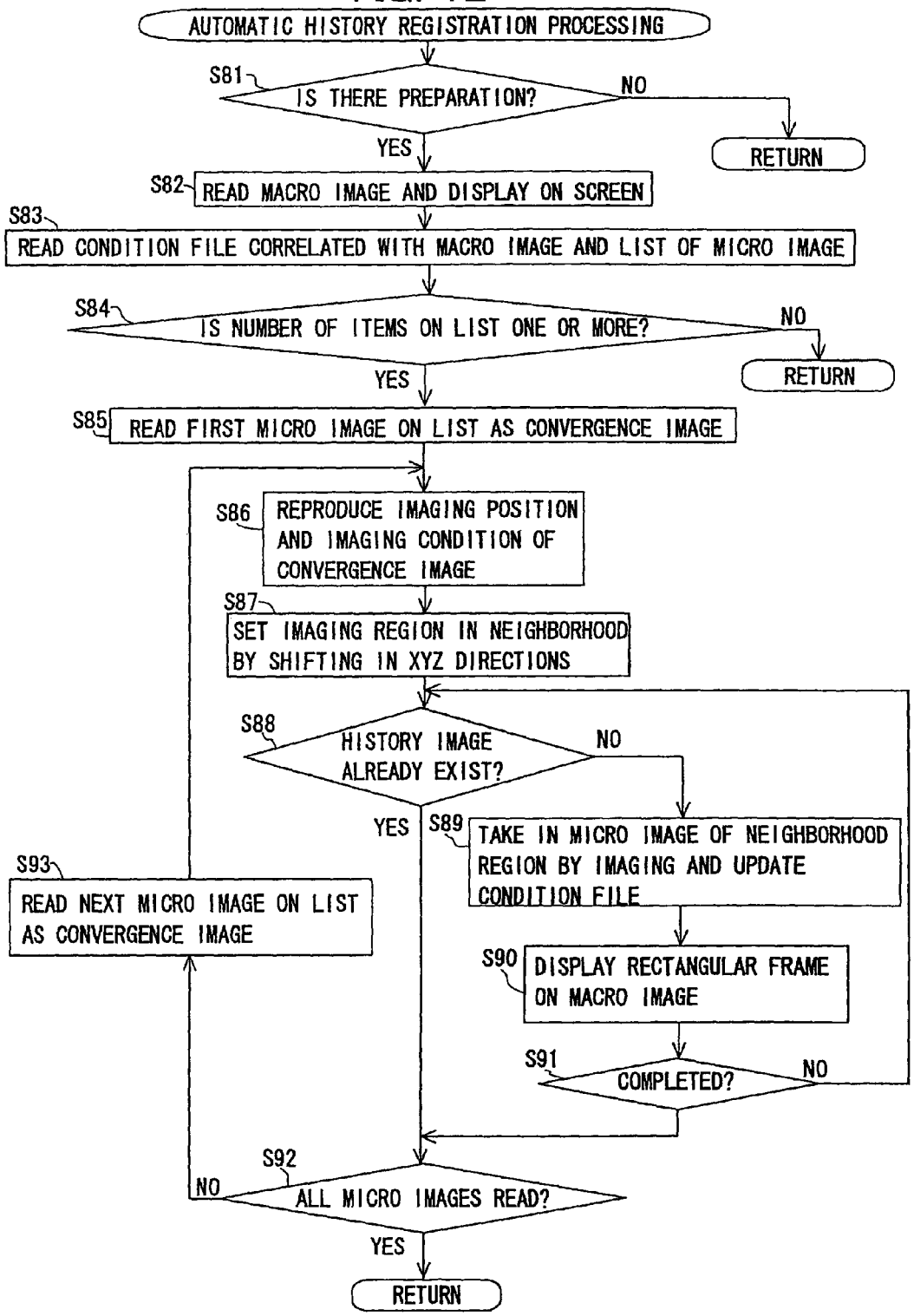
FIG. 12 is a flowchart showing a procedure of automatic history registration processing.

When the observer selects one micro image from the list displayed on the split region 64 of the screen 60 of the computer 24 and presses the reproduce button 56 in the split region 52, the controller 40 executes reproduction processing (S61 to S72) of FIG. 11.

In Step S61, to recognize the selected micro image in the list on the split region 64 when the reproduce button 56 is pressed, a list number correlated with the micro image is obtained from the input unit 25. Further, in Step S62, a condition file correlated with the selected micro image (for example: name ABC.txt) is read from the history database of the computer 24. Further in Step S63, a registration number correlated with the read condition file is obtained.

Next, in Step S64, it is detected whether a preparation (specimen 10A) is present on the stage member 11 or not. When the preparation (specimen 10A) is present, (Yes in S64), the flow proceeds to processing of Step S65, and then it is judged whether the registration number (selection number) obtained in Step S63 is identical or not to the registration number (specimen number) corresponding to identification information of the specimen 10A. When the two registration numbers match (Yes in S65), the flow proceeds to processing of Step S66.

In Step S66, in the already read condition file, with reference to the list number obtained in Step S61 an imaging position (x and y positions on the stage member 11) and imaging conditions (magnification of the objective lens member, magnification of the reducing lens member, diaphragm stop, focal point position, brightness of illumination) are read. For example, with reference to the list number "2" in the condition file (name: ABC.txt) shown in FIG. 5, a group of set conditions, which are magnification=10, diaphragm stop=75, x coordinate=1000, y coordinate=2000, focal point position=3000, and brightness of illumination=180, is read.

Next (Step S67), the controller 40 controls the respective circuits (41 to 47) based on the read imaging position and imaging conditions from the condition file (name: ABC.txt), and actually drives electrically the respective parts of the microscope system 10. Specifically, set conditions of the respective parts of the microscope system 10 are reproduced.

Concretely, the stage control circuit 43 is controlled based on the read "x coordinate, y coordinate" to reproduce the imaging position. Further, the objective lens driving circuit 45, the reducing lens driving circuit 46, and the CCD control circuit 47 are controlled based on the read "magnification", the diaphragm control circuit 42 is controlled based on the "diaphragm stop", the focus control circuit 44 is controlled based on the "focal point position", and the illumination control circuit 41 is controlled based on the "brightness of illumination", thereby reproducing the imaging conditions.

Thereafter, the controller 40 images the specimen 10A and takes in a micro image, and displays it on the split region 51 of the computer 24 (Step S68). Therefore, the observer can observe again an image of the specimen 10A at the same position with the same brightness without repeating complicated adjusting operations. When the reproduction processing of FIG. 11 is thus completed, the controller 40 returns to the button input detection processing of FIG. 6.

On the other hand, when the preparation (specimen 10A) is not present (No in S64), as well as when the preparation (specimen 10A) is present but a specimen number thereof and a selection number are different (No in S65), the "reproduction" as in the above-described Steps S66 to S68 cannot be performed, and thus the flow proceeds to processing of Step S69.

In Step S69, a macro image correlated with the registration number (selection number) obtained in Step S63 is read from the history database of the computer 24 and the external storage unit 27. Then, the read macro image is displayed on the split region 61 of the computer 24 (Step S70). At this time, read specimen information (such as registration number) of the macro image is displayed on the split region 63.

Further, in Step S71, the selected micro image is read from the history database of the computer 24 and the external storage unit 27 and displayed on the split region 51 of the computer 24. Further, in Step S72, read processing (S31 to S39 of FIG. 8) of another micro image correlated with the micro image is executed. As a result, another micro image is displayed on the split region 64 by a thumbnail, and also a rectangular frame is displayed on the split region 61. Accordingly, the selected micro image can be observed together with another micro image.

(Automatic History Registration Processing)

Further, in the microscope system 10 of this embodiment, a spare time not used for imaging of a specimen 10A (FIG. 9), virtual observation (FIG. 10), or the like is used to execute the automatic history registration processing (S81 to S93) of FIG. 12, thereby reinforcing the history database of the computer 24. This processing may be started by automatically detecting that the observer is not operating, or may be started when the observer presses the image neighborhood button 57 of FIG. 3.

In Step S81, it is judged whether a preparation (specimen 10A) is present on the stage member 11 or not. Then, when the preparation (specimen 10A) is not present (No in S81), the automatic history registration processing is terminated.

On the other hand, when the preparation (specimen 10A) is present on the stage member 11 (Yes in S81), the flow proceeds to processing of Step S82, and a macro image correlated with a registration number corresponding to identification information of the specimen 10A is read from the history database of the computer 24. Then, it is displayed on the split region 61 of FIG. 3.

Next (Step S83), a condition file (for example: ABC.txt) correlated with the read macro image is read from the history database of the computer 24, and a list of micro images correlated with the read macro image is read (Step S83). Then, when the number of items (namely, the number of registered past micro images) on the list is 0 (No in Step S84), the automatic history registration processing is terminated.

Further, when the number of items on the list (namely, the number of registered past micro images) is one or more (Yes in Step S84), the first micro image on the list is read as a convergence image (Step S85). In next step S86, the condition file (FIG. 5) is referred, and an imaging position (x and y positions of the stage member 11) and imaging conditions (magnification of the objective lens member, magnification of the reduced lens unit, diaphragm stop, focal point position, brightness of illumination) correlated with the convergence image are read. Then the respective circuits (41 to 47) are controlled based on the imaging position and imaging conditions, and the respective parts of the microscope system 10 are actually driven electrically. Specifically, set conditions of the respective units of the microscope system 10 are reproduced.

Next (Step S87), the controller 40 uses an angle of view Δx in an x direction, an angle of view Δy in a y direction, and a depth of focus Δz determined by the optical system of the microscope system 10 (refer to FIG. 13) to make a slight shift from the current imaging position (x and y positions of the stage member 11), as well as a slight shift from the current focal point position (z position of the objective lens member 17). Specifically, the imaging position and the focal point position are fine adjusted. Then imaging regions are set in a peripheral neighborhood of the position of the convergence image reproduced in Step S87.

For example, as shown in FIG. 13, as the peripheral neighborhood of the position 70 of the convergence image, two positions 71, 74 shifted by the amount of the angle of view Δy in the y direction from the position 70, two positions 72, 73 shifted by the amount of the angle of view Δx in the x direction from the position 70, and two positions 75, 76 shifted by the amount of the depth of focus Δz in the z direction from the position 70 are conceivable (six positions in total). As a first stage, imaging regions may be set to these six positions (positions 71 to 76) respectively to thereby perform processing of Step S88 and thereafter. Proceeding the stage further, imaging regions may be set to positions 77 to 80 respectively, which are more separated in distance from the position 70 of the convergence image than the positions 71 to 76 (second stage), or imaging regions may be set to positions 81 to 84, respectively (third stage).

In Step S88, it is judged whether a micro image in an imaging region in the neighborhood set in Step S87 is already registered as a history image or not. When it is registered (Yes in S88), imaging at this position is not performed. When it is not registered (No in S88), the flow proceeds to Step S89, where a micro image in the neighborhood region is taken in by imaging, correlated with the macro image in the split region 61 and the registration number, and stored additionally in the external storage unit 27. Further, information of the micro image is registered in the history database of the computer 24, and the condition file (for example: name ABC.txt) is updated.

Further, the imaging position of the micro image is displayed by a rectangular frame overlapping on the macro image displayed in the split region 61 of FIG. 3. However, in this case, the rectangular frame is given a different color as that of a micro image registered by normal imaging (registration processing of FIG. 9), and moreover, it is not displayed on thumbnails in the split region 64, thereby distinguishing the automatically taken micro image.

The processing of S87 to S91 is repeated for the imaging regions in the peripheral neighborhood (for example, the positions 71 to 76 of FIG. 13) of the position 70 of the convergence image, and when processing such as imaging, additional storing or the like in the peripheral neighborhood of the position 70 of the convergence image is completed, the flow proceeds to subsequent Step S92.

In Step S92, it is judged whether reading of all the items on the list of micro images is completed or not, and when there is any micro image which is not read yet (No in S92), the next micro image on the list is read as a convergence image in Step S93. Then, the similar processing as above (S86 to S92) is repeated. When all the micro images on the list are read, (Yes in S92), this automatic history registration processing is terminated.

By executing the automatic history registration processing (S81 to S93) of FIG. 12 and by automatically performing processing such as imaging of a micro image, additional storing, and so on for the peripheral neighborhood of a position (position 70 of the convergence image of FIG. 13) of each of micro images, it becomes possible to observe, when observation is indirectly performed off-line later (FIG. 10), a high precision micro image in a wide range including not only the position (position 70 of FIG. 13) converged by the observer but also the peripheral neighborhood thereof (for example, positions 71 to 76). When a position in a focus direction is included in the peripheral neighborhood, a micro image having a three-dimensional structure can be generated. This is preferable for observing a three-dimensional specimen, a semiconductor wafer, an IC chip, MEMS, and the like. Further, not only an imaging position and a focal point position but other imaging conditions such as magnification may be finely adjusted to perform the similar automatic history registration processing.

The microscope system 10 of this embodiment is preferable for medical education which is conducted between a student and a teacher, or a doctor and a laboratory technician. A student (laboratory technician) stores diagnosis results (a macro image, a condition file and micro images) of a specimen 10A in the external storage device 27 and the history database of the computer 24. Then, after the diagnosis is completed, the student (laboratory technician) informs a teacher (doctor) of a registration number corresponding to identification information of the specimen 10A.

When the teacher (doctor) connects the microscope system 10 of this embodiment to the history database of the computer 24 and reads the already registered macro images and micro images (history images) using the registration number informed by the student (laboratory technician), he/she is able to see what position of the specimen 10A is converged when performing the diagnosis even when the specimen 10A is not present.

Further, when the teacher (doctor) receives the specimen 10A from the student (laboratory technician) and observes it using the microscope system 10, the teacher can reproduce the same imaging position and the same imaging conditions to observe the specimen 10A again and reproduce the diagnosis results by the student (laboratory technician) easily by selecting a position (micro image) on the specimen 10A where the diagnosis is performed. Further, it is possible to verify later whether the diagnosis results by the student (laboratory technician) are appropriate or not.

Further, at this time, by performing imaging of other positions which should be converged and additionally storing micro images thereof in the history database of the computer 24 by the teacher (doctor), it becomes possible for the student (laboratory technician) to confirm them later in the history database using the microscope system 10.

Also, the diagnosed position, date and time of diagnosis and the name of a person conducted the diagnosis for each of specimens can be recorded as history information, which makes it possible to perform verification when a problem such as oversight, misdiagnosis, or the like occurs.

(Adjusting Displacement of a Mounting Position of a Preparation)

In the present invention, when a new preparation is inserted, image recognition is performed with identification information (for example, an imaged macro image) of the preparation (specimen 10A), and it is judged that a sample thereof exists in the history database, it is preferable to correct displacement and rotation of a position where the preparation is placed so that the position of an already imaged micro image can be precisely reproduced.

Figure 14:
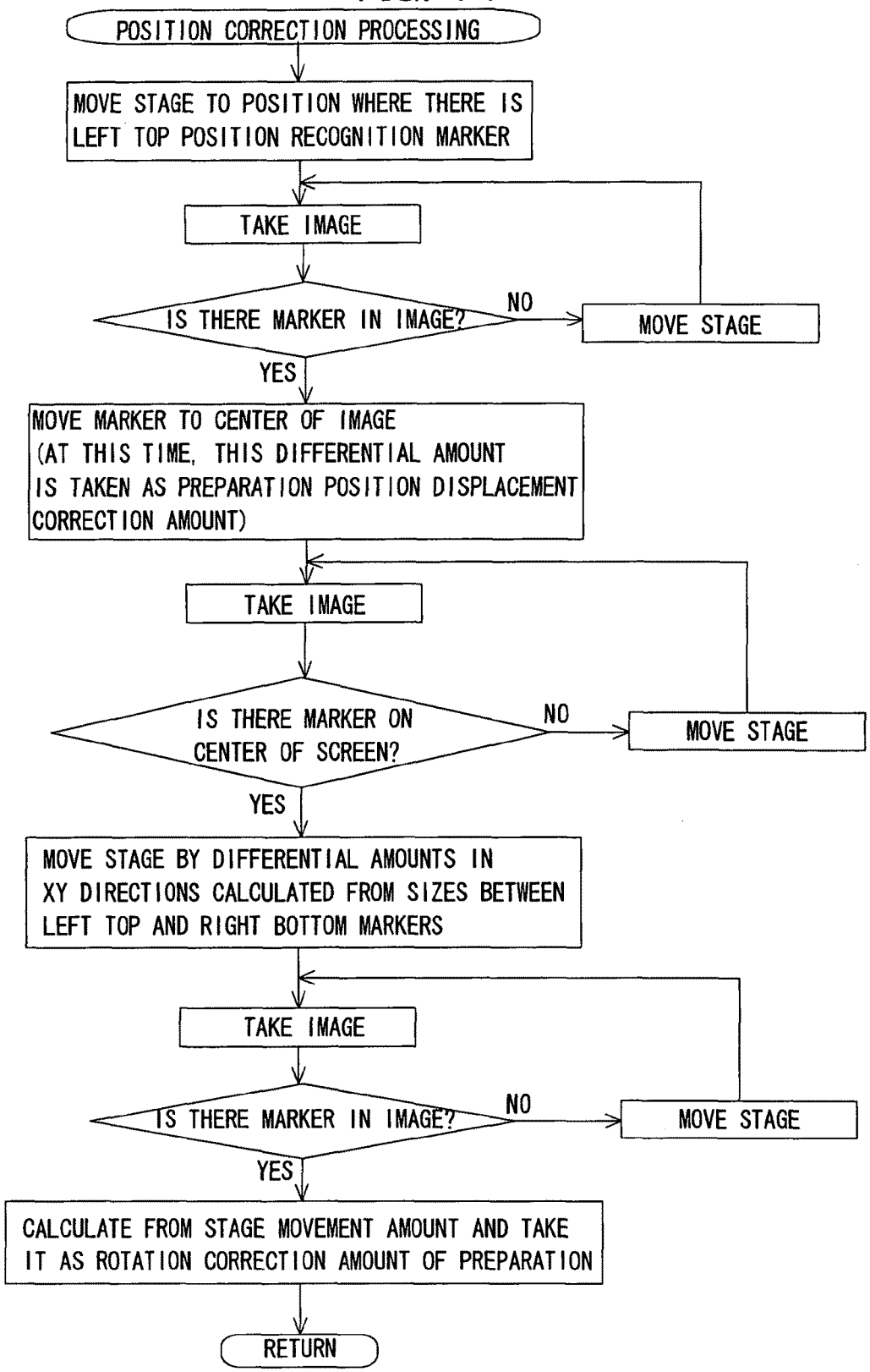
FIG. 14 is a flowchart of performing position recognition.
Figure 15:
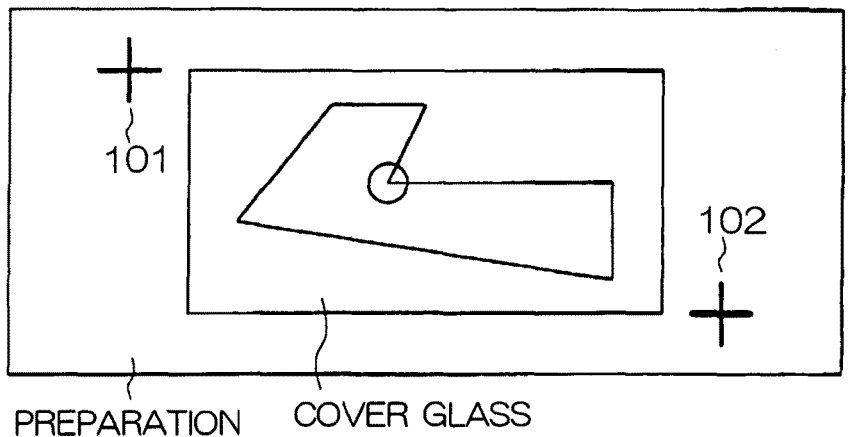
FIG. 15 is a view explaining a position recognition marker.
Figure 16:
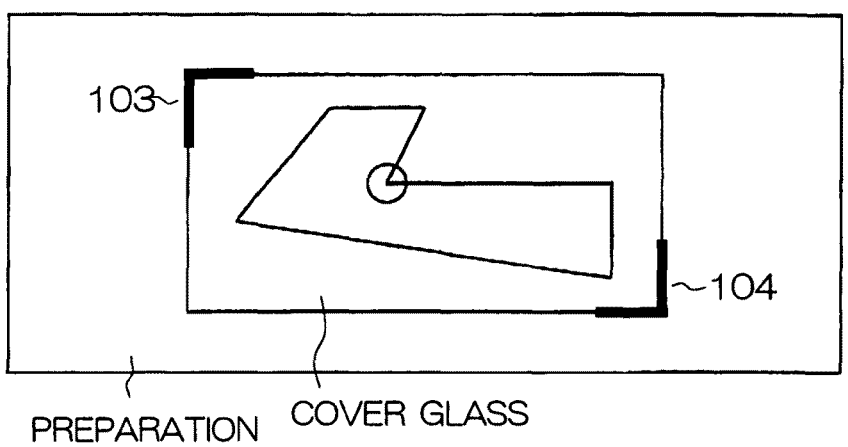
FIG. 16 is a view explaining another example of a position recognition marker.

With reference to FIG. 14 and FIG. 15, adjustment of displacement in mounting position of a preparation will be explained. The size of a preparation and the size of a cover glass are standardized, and it is assumed that a left top position recognition marker 101 and a right bottom position recognition marker 102 exist at specific positions on the preparation.

First, the stage is moved to the position of the left top position recognition marker 101 on the preparation. An image is taken there, and the presence of the left top position recognition marker 101 on the image is confirmed. A confirmation method thereof is possible in such a manner that an image of the shape of the left top position recognition marker 101 is stored in the computer, and then determination as the left top position recognition marker 101 can be made when a differential amount from the image is adequately small.

If the presence of the left top position recognition marker 101 could not be confirmed, the left top position recognition marker 101 is searched by taking images while moving the stage leftward/rightward and upward/downward by half the taken image size.

Then, the stage is moved slightly so that the left top position recognition marker 101 is at the center of the image. At this time, the above-described confirmation method is used for confirmation of whether it is moved to the center or not.

Thereafter, the stage is moved in X and Y directions by differential amounts of positions where the left top position recognition marker 101 and the right bottom position recognition marker 102 are specified. Then, an image is taken, and it is confirmed that the right bottom position recognition marker 102 is present over the image. Also at this time, the above-described confirmation method is used for confirmation of whether it is moved to the center or not.

Then, correction values for displacement and rotation of the position of the preparation are calculated from the differential amount recognized as the position of the right bottom position recognition marker 102 and from an original default differential amount. For example, when making parallel movement, it is recognized that, when being brought to the center of the image, the left top position recognition marker 101 supposed to be at the position X=10, Y=8 of the stage is recognized as X=11, Y=9 (moved one each in rightward and downward). From these data, X=−1, Y=−1 are stored as correction values of the parallel movement and used when moving the stage.

Further, in the case of making rotational movement, when differential amounts of respective positions of the left top position recognition marker 101 and the right bottom position recognition marker 102 are XO=80, YO=60 in ideal data, the differential amounts become X1=79, Y1=61 if it is a clockwise rotation by a few degrees. By solving an equation using a rotational matrix from these data, the amount of rotation can be recognized. These data are used as rotational correction values of the stage.

Figure 17:
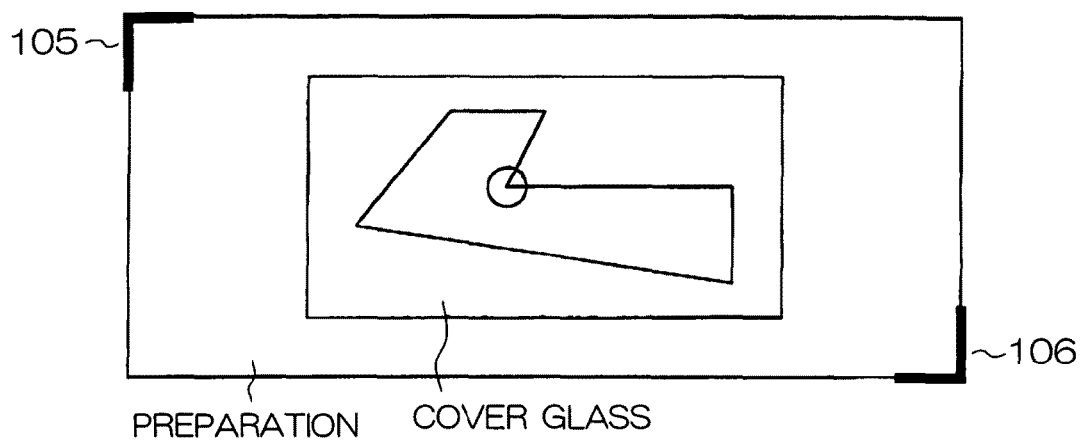
FIG. 17 is a view explaining another example of a position recognition marker.

Further, the above example shows a case that the left top position recognition marker 101 and the right bottom position recognition marker 102 are drawn on the preparation (FIG. 14), but positions of a left top vertex 103 and a right bottom vertex 104 of a cover glass as in FIG. 15 or a left top vertex 105 and a right bottom vertex 106 of the preparation as in FIG. 17 may be used as markers by using edge enhancement processing and centerline processing on an image.

Further, when a micro image is read, it is also possible to increase accuracy by updating parallel movement or rotation amount of the stage by calculating differential amounts of a history image and an actually taken image.

Modification Example

Note than in the above described embodiment, there is explained an example in which a barcode for identification is affixed as a sticker on a preparation part of a specimen 10A, and identification information of the specimen 10A is obtained, but any method may be used as long as it is possible to correlate the specimen 10A and a macro image. For example, a method is conceivable in which the macro image is binarized and recorded as unique data (including a method to carve a pattern on a preparation part, a method to affix a hand-written memo and recognize it as an image, and the like). Further, it is conceivable to adhere a recording medium such as an IC chip or a magnetic substance on the preparation part and provide a means to read data thereof, so that a specimen 10A can be identified uniquely.

Further, in the above-described embodiment, for making the explanation simple, the position of a specimen 10A on the stage member 11 is always the same (even when re-mounted), but the present invention is not limited thereto. If the position (including rotation) of a specimen 10A changes on the stage member 11 every time it is mounted thereon, it is preferable that a relative position of the specimen 10A on the stage member 11 with the stage member 11 (namely, a displacement value between the coordinate system of the stage member 11 and the coordinate system of the specimen 10A) is added when correlating a micro image and a macro image.

For example, it is conceivable that, when a specimen 10A is mounted on the stage member 11, a displacement value XYθ in coordinate systems of the both is detected in advance, and when a micro image is registered, the displacement value XYθ in coordinate systems in addition to the imaging position (x and y positions of the stage member 11) thereof are written in a condition file thereof. Further, it is conceivable that the position of a micro image on a macro image is obtained by correcting the imaging position (x and y positions of the stage member 11) of the micro image by the displacement value XYθ in coordinate systems (namely, performing coordinate conversion processing), and the position is written in a condition file.

When detecting the displacement value XYθ in coordinate systems, for example, an edge (angle) of a preparation part, a barcode or label for identification, or the like may be used as the position of origin of a specimen 10A. Further, for detection of the displacement value XYθ, a method is conceivable in which, for example, a ½ macro image of a specimen 10A is taken in, an edge (or barcode) on a preparation part is detected by image processing, and pattern recognition is performed so as to grasp the coordinates of the specimen 10A.

Moreover, the displacement value XYθ may be obtained by repetitively moving to the same imaging position (x and y positions of the stage member 11) constantly and taking in a micro image of high magnification instead of a macro image, and then taking in micro images while moving the stage member 11 on the periphery thereof and performing image matching with past micro images. Further, the displacement value XYθ may be obtained always on the bases of a fixed point in the stage coordinate system or on the bases of a previous specimen coordinate system.

Moreover, in the above-described embodiment, there is explained an example in which a macro image is taking in only once for one specimen 10A (only when new registration), but the present invention is not limited thereto. A macro image may be taken in and history thereof may be stored each time (every time) a specimen 10A is reloaded. In this case, not a macro image correlated with identification information of a specimen 10A but a newly taken macro image is displayed.

Further, in the above-described embodiment, there is explained an example of explicitly storing a micro image by pressing the image button 54 (instruction of registration), but the present invention is not limited thereto. It may be constructed such that a micro image is automatically stored when the observer performs an operation (instruction from the outside) such as inputting a comment at a position where the observer is interested in.

Moreover, in the above-described embodiment, there is explained an example in which the observer inputs characters and/or symbols (comments) as information of observational history from the keyboard 24A of the computer 24, but the present invention is not limited thereto. Not being limited to such text data, audio data may be stored as a comment in the history information.

Further, in the above-described embodiment, there is explained an example in which the microscope system 10 and the history database of the computer 24 are connected one to one, but the present invention is not limited thereto. For example, also a form is possible in which a plurality of microscope systems 10 are connected to one computer 24 (history database) and imaging information is registered from the respective microscope systems 10 to a common history database. In this case, it is preferable that identification information (such as serial number) of the microscope system 10 is written additionally to information of observational history. Accordingly, it becomes possible to judge later which microscope system 10 is used to newly (or additionally) register a micro image.

Moreover, in the above-described embodiment, there is explained an example of using the two screens 50, 60 of the computer 24, but the present invention is applicable even when there is one screen used.

Further, in the above-described embodiment, the external storage unit 27 is used for storing a macro image file, a condition file, and a micro image file, but alternatively the same storage unit as that for the history database of the computer 24 may be used.

Moreover, in the above-described embodiment, a file name is given with a presumption that a macro image and a micro image are used in a personal computer, but when this use is not expected, giving of a file name can be omitted. Then, the macro image and the micro image may be stored at determined addresses in a memory of the microscope system 10.

Further, in the above-described embodiment, there is explained an example of the microscope system 10 including a CCD camera and having a box shape, but the present invention can be applied to a general microscope system. As the general microscope, a structure with a replaceable objective lens, a structure with a detachable CCD camera, and the like are conceivable.

Moreover, in the above-described embodiment, there is explained an example in which the stage member 11 is moved relative to the fixed imaging system (namely the imaging member (17 to 21), CCD camera 22), but the imaging system (17 to 22) may be moved relative to the fixed stage member 27, or both the stage member 11 and the imaging system (17 to 22) may be moved relatively.

Further, in the above-described embodiment, there is explained an example of the microscope system 10 for observing a specimen 10A with transillumination, but the present invention can be applied to a microscope system by means of reflective illumination (epi-illumination).

Moreover, in the above-described embodiment, there is explained an example of the microscope system 10 with no eyepiece lens, but the present invention is not limited thereto. The present invention may be applied to a microscope system capable of observing a specimen with an eyepiece lens similarly to a normal microscope. In this case, for example, the mirror 18 may be replaced with a half mirror, the observational optical path 10B may be divided by the half mirror into two optical paths, the CCD camera 22 may be arranged on one optical path, and the eyepiece lens may be arranged on the other optical path. Visual observation with an eyepiece lens has high sensitivity and can correspond to a rapid change (stage movement). In this case also, history of a visually observed specimen image can be left as a micro image or a comment.

Further, in the above-described embodiment, presence of a preparation on the stage member 11 is detected by the preparation holder 11A and the sensor 39A, but the present invention is not limited thereto. An acquiring operation of a macro image can be performed regardless of presence of a preparation, and then the presence of the preparation on the stage member 11 may be detected depending on whether the macro image is actually acquired or not.

Moreover, in the above-described embodiment, there is explained an example in which a preparation itself is identified, and if it is a preparation for which a macro image and a micro image are already acquired once, the preparation is correlated with a registered macro image in an existing image record file, and a new micro image is additionally stored, without newly creating an image record file. The micro image may be stored one by one, but when a plurality of micro images are adjacent to each other as shown in FIG. 18, these micro images may be combined with each other by tiling processing and stored as one micro image. Moreover, when the same preparation is put in the microscope system again and a new micro image is acquired (FIG. 19), and if it is a micro image adjacent to a micro image stored in the past, it is preferable that the past micro image and the new micro image are combined by tiling processing and stored as one micro image.

What is claimed is:

1. A microscope system having a microscope and an imaging apparatus that images a specimen on a stage of the microscope to produce a newly imaged specimen, the system comprising:
    an acquiring section that acquires identification information of the specimen on the stage;
    a storage section that stores a macro image and a micro image of the specimen that is imaged by the imaging apparatus in a correlated manner with the identification information of the specimen acquired by the acquiring section;
    an additional storing section that automatically judges whether or not the specimen is a registered specimen already stored in the storage section based on the identification information of the specimen, and additionally stores in the storage section when the specimen is judged as the registered specimen a micro image of the newly imaged specimen by the imaging apparatus in a correlated manner with the macro image of the registered specimen;

a first display section that displays the macro image of the specimen;

a second display section that displays the micro image of the specimen; and a display control section that performs display control of the first display section and the second display section, wherein the display control section judges whether the specimen is a new specimen or a registered specimen for which the micro image correlated with the macro image is already stored in the storage section based on the identification information of the specimen acquired by the acquiring section, and when the specimen is judged as a new specimen, the display control section displays the macro image of the specimen imaged by the imaging apparatus on the first display section and displays a micro image correlated with the macro image of the specimen displayed on the first display section on the second display section; and when the specimen is judged as the registered specimen, the display control section reads the macro image of the specimen stored in the storage section and displays the macro image on the first display section, and switches the micro image displayed on the second display section to either the micro image correlated with the macro image of the specimen stored in the storage section or the micro image of the specimen being imaged by the imaging apparatus.

2. The microscope system according to claim 1 wherein:
the storage section stores information of observational history for the specimen in a correlated manner in addition to the identification information, the macro image and the micro image; and
the additional storage section updates the information of observational history when the micro image displayed on a second display section is stored.

3. The microscope system according to claim 2 wherein the information of observational history includes information of date and time regarding a storage operation of the micro image displayed on the second display section and information of an observer name.

4. The microscope system according to claim 3, wherein the information of observational history includes identification information of the microscope system.

5. The microscope system according to claim 1, wherein the storage section stores information of observational history for the specimen in a correlated manner in addition to the identification information, the macro image and the micro image, the system further comprising:
a third display section that reads from the storage section a macro image and a micro image correlated with predetermined identification information in accordance with an instruction from outside the third display section and displays the macro image and the micro image; and
an updating section that updates the information of observational history correlated with the predetermined identification information in accordance with an instruction from outside of the updating section during displaying by the third display section.

6. The microscope system according to claim 1, wherein the storage section performs correlation including information of an imaging position and an imaging condition of each of the micro images when correlating the macro image and the micro image, the system further comprising:

a fine control section that reads and reproduces from the storage section the imaging position and imaging condition of a micro image correlated with identification information acquired by the acquiring section, and thereafter fine controls the imaging position and imaging condition when the specimen as an observation target is mounted on the stage; and a control section that generates the micro image of the specimen by imaging the specimen as an observation target after being fine controlled by the fine control section, and additionally stores in the storage section the micro image in a correlated manner with the macro image displayed on the first display section and the identification information acquired by the acquiring section.

7. The microscope system according to claim 1, wherein the additional storing section combines a plurality of micro images adjacent to each other out of past micro images correlated with a macro image of at least one of the registered specimen and a micro image newly imaged by the imaging apparatus, and stores the combined image as one micro image in the storage section.

8. A microscope system having a microscope and an imaging apparatus that images a specimen on a stage of the microscope to produce a newly imaged specimen, the system comprising:

an acquiring section that acquires identification information of the specimen on the stage;

a storage section that stores a macro image and a micro image of the specimen that is imaged by the imaging apparatus in a correlated manner with the identification information of the specimen acquired by the acquiring section;

an additional storing section that judges whether or not the specimen is a registered specimen already stored in the storage section based on the identification information of the specimen, and additionally stores in the storage section when the specimen is judged as the registered specimen a micro image of the newly imaged specimen by the imaging apparatus in a correlated manner with the macro image of the registered specimen;

a first display section that displays the macro image of the specimen;

a second display section that displays the micro image of the specimen; and a display control section that performs display control of the first display section and the second display section, wherein:

the display control section judges whether the specimen is a new specimen or a registered specimen for which the micro image correlated with the macro image is already stored in the storage section based on the identification information of the specimen acquired by the acquiring section, and when the specimen is judged as a new specimen, the display control section displays the macro image of the specimen imaged by the imaging apparatus on the first display section and displays a micro image correlated with the macro image of the specimen displayed on the first display section on the second display section; and when the specimen is judged as the registered specimen, the display control section reads the macro image of the specimen stored in the storage section and displays the macro image on the first display section, and further displays by switching to either an off-line mode in which the micro image displayed on the second display section is the micro image correlated with the macro image of the specimen stored in the storage section or an on-line mode in which the micro image displayed on the second display section is the micro image of the specimen being imaged by the imaging apparatus.

9. A microscope system having a microscope and an imaging apparatus that images a specimen on a stage of the microscope to produce a newly imaged specimen, the system comprising:

an acquiring section that acquires identification information of the specimen on the stage;

a storage section that stores a macro image and a micro image of the specimen that is imaged by the imaging apparatus in a correlated manner with the identification information of the specimen acquired by the acquiring section;

an additional storing section that judges whether or not the specimen is a registered specimen already stored in the storage section based on the identification information of the specimen, and additionally stores in the storage section when the specimen is judged as the registered specimen a micro image of the newly imaged specimen by the imaging apparatus in a correlated manner with the macro image of the registered specimen;

a position recognition marker section that detects and stores a position recognition marker of the specimen from an image of the specimen imaged by the imaging apparatus; and a positional correction section that judges whether the specimen is a new specimen or a registered specimen for which the macro image and the micro image are already stored in the storage section based on the identification information of the specimen acquired by the acquiring section, and corrects when the specimen is judged as the registered specimen a mounting position on the stage of the specimen mounted on the stage to a regular position based on the position recognition marker stored in the position recognition marker section.

10. An image processing method for a microscope system that comprises a microscope and an imaging apparatus that images a specimen on a stage of the microscope to produce a newly imaged specimen, the method comprising:

an acquiring step of acquiring identification information of the specimen on the stage;

a storing step of storing a macro image and a micro image of the specimen that are imaged by the imaging apparatus in a correlated manner with the acquired identification information of the specimen; and an additional storing step of automatically judging whether or not the specimen is a registered specimen already stored in the storing step based on the identification information of the specimen and additionally storing when the specimen is judged as the registered specimen a micro image of the newly imaged specimen by the imaging apparatus in a correlated manner with the macro image of the registered specimen, wherein the microscope system comprises a first display section that displays the macro image of the specimen and a second display section that displays the micro image of the specimen, and performs display control of the first display section and the second display section, the method further comprising:

judging whether the specimen is a new specimen or a registered specimen corresponding to the macro image and the micro image that are already stored based on the acquired identification information of the specimen;

when the specimen is judged as a new specimen, displaying the macro image of the specimen imaged by the imaging apparatus on the first display section and displaying the micro image of the specimen imaged by the imaging apparatus on the second display section; and when the specimen is judged as the registered specimen, reading the stored macro image of the specimen stored in the storage section and displaying the macro image on the first display section, and further switching the micro image displayed on the second display section to either a micro image of the specimen stored in the storing step or the micro image of the specimen being imaged by the imaging apparatus.

\* \* \* \* \*